US009418180B2

(12) United States Patent
Maliassov

(10) Patent No.: US 9,418,180 B2
(45) Date of Patent: Aug. 16, 2016

(54) METHOD AND SYSTEM FOR PARALLEL MULTILEVEL SIMULATION

(75) Inventor: Serguei Maliassov, Spring, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 492 days.

(21) Appl. No.: 13/701,423

(22) PCT Filed: Apr. 25, 2011

(86) PCT No.: PCT/US2011/033793
§ 371 (c)(1),
(2), (4) Date: Nov. 30, 2012

(87) PCT Pub. No.: WO2012/015500
PCT Pub. Date: Feb. 2, 2012

(65) Prior Publication Data
US 2013/0116993 A1 May 9, 2013

Related U.S. Application Data

(60) Provisional application No. 61/367,713, filed on Jul. 26, 2010.

(51) Int. Cl.
G06G 7/48 (2006.01)
G06F 7/60 (2006.01)
(Continued)

(52) U.S. Cl.
CPC .............. *G06F 17/5009* (2013.01); *G01V 9/00* (2013.01); *G06F 17/5018* (2013.01); *G06F 2217/16* (2013.01)

(58) Field of Classification Search
CPC ..... G06F 17/12; G06F 17/13; G06F 17/5009; G06F 17/5018; G06F 2217/16; G01V 9/00

USPC ........................................................ 703/10, 2
See application file for complete search history.

(56) References Cited

U.S. PATENT DOCUMENTS 6,052,520 A 4/2000 Watts, III
6,230,101 B1 5/2001 Wallis
(Continued)

FOREIGN PATENT DOCUMENTS

EP 2068263 A2 6/2009
WO WO2009075945 * 6/2009 ............. E21B 43/12

OTHER PUBLICATIONS

Willien et al., "AMG preconditioning for sedimentary basin simulations in Temis calculator", 2009, Marine and Petroleum Geology 26, pp. 519-524.*

(Continued)

*Primary Examiner* — Kamini S Shah
*Assistant Examiner* — Juan Ochoa
(74) *Attorney, Agent, or Firm* — ExxonMobil Upstream Research Company, Law Dept.

(57) ABSTRACT

Exemplary embodiments of the present techniques provide methods and systems for coarsening a computational mesh, for example, for use in a reservoir simulation. An exemplary method of performing a reservoir simulation, includes generating a data representation in a storage system, wherein the data representation includes an interconnection weight that represents the magnitude of an interconnection between each of a number of computational cells in a computational mesh. A threshold value is compared to each interconnection weight and any interconnection weight that is equal to or less than the threshold value is set to zero.

18 Claims, 19 Drawing Sheets

(51) Int. Cl.
*G06F 17/50* (2006.01)
*G01V 9/00* (2006.01)

(56) References Cited

U.S. PATENT DOCUMENTS

| | | | |
|---|---|---|---|
| 6,662,146 B1 | 12/2003 | Watts | |
| 7,516,056 B2 | 4/2009 | Wallis et al. | |
| 7,921,003 B2* | 4/2011 | Miller | G06T 13/60 703/9 |
| 8,650,016 B2* | 2/2014 | Lunati | E21B 49/00 703/10 |
| 2006/0235667 A1 | 10/2006 | Fung et al. | |
| 2007/0010979 A1 | 1/2007 | Wallis et al. | |
| 2007/0255779 A1 | 11/2007 | Watts, III | |
| 2008/0025633 A1 | 1/2008 | Szeliski | |
| 2008/0167849 A1 | 7/2008 | Hales et al. | |
| 2008/0177519 A1 | 7/2008 | Miller et al. | |
| 2010/0082142 A1 | 4/2010 | Usadi et al. | |
| 2010/0082509 A1 | 4/2010 | Mishev et al. | |

OTHER PUBLICATIONS

Yousef Saad, "Iterative Methods for Sparse Linear System", 2003, 2nd. edition, SIAM, pp. 1-547.*
Frank and Vuik, "On the Construction of Deflation-Based Preconditioners", 2001, SIAM J. Sci. Computers, pp. 442-462.*
Klie et al., Deflation AMG Solvers for Highly Ill-Conditioned Reservoir Simulation Problems, 2007, SPE 105820-MS, SPE Reservoir Simulation Symposium, pp. 1-9.*
Chen et al., (Chen hereinafter), Fast Computational Methods for Reservoir Flow Models, Aug. 23, 2009, pp. 1-20.*
Benzi, Preconditioning Techniques for Large Linear Systems: A Survey, 2002, Journal of Computational Physics 182, pp. 418-477.*
Maliassov and Shuttleworth, "Partitioners for Parallelizing Reservoir Simulations", 2009, Society of Petroleum Engineers Reservoir Simulation Symposium, pp. 1-8.*
Aase, N.E., et al., (2005), *The Effect of Hydrocarbons on Quartz Cementation: Diagenesis in the Upper Jurassic Sandstones of the Miller Field, North Sea, Revisited,* 11 Petroleum Geoscience 215-223.
Aziz, K. et al., (1979), *Petroleum Reservoir Simulation,* Applied Science Publishers Ltd, Barking, Essex, England.
Clees, T., et al., (2007), *An Efficient Algebraic Multigrid Solver Strategy for Adaptive Implicit Methods in Oil Reservoir Simulation,* SPE 105789.
Dubois, O, et al., (2009), *Energy Minimizing Bases for Efficient Multiscale Modeling and Linear Solvers in Reservoir Simulation,* SPE 119137.
Fletcher, I.R., et al., (2008), *Nanosims Mu µ-Scale In Situ Measurement of C-13/C-12 in Early Precambrian Organic Matter, with Permil Precision,* 278 International Journal of Mass Spectrometry 59-68.
Gratien, J.M., et al., (2007), *Scalability and Load-Balancing Problems in Parallel Reservoir Simulation,* SPE 106023.
Lu, P, et al., (2009), *Experience with Numerical Stability, Formulation and Parallel Efficiency of Adaptive Implicit Methods,* SPE 118977.
Mattax, C.C. et al., (1990), *Reservoir Simulation, Monograph,* vol. 13, Society of Petroleum Engineers.
Peaceman, D.W., (1977), *Fundamentals of Numerical Reservoir Simulation,* Elsevier, N.Y.
Saad, Y., (2003), *Iterative Methods for Sparse Linear Systems,* 2nd ed., Society for Industrial and Applied Mathematics (SIAM), pp. 171-193, 241-258.
Sharp, Z., (2007), *Principles of Stable Isotope Geochemistry* (Pearson Prentice Hall, Upper Saddle River, NJ
Woo, P.T., et al., (1973), *Application of Sparse Matrix Techniques in Reservoir Simulation,* SPE 4544.
Varga, R.S., (1962), *Matrix Iterative Analysis,* Prentice-Hall.
C. I. Macaulay, A. E. Fallick, R. S. Haszeldine, and C. M. Graham, *Methods of Laser-Based Stable Isotope Measurement Applied to Diagenetic Cements and Hydrocarbon Reservoir Quality,* 35 Clay Minerals 313-322 (2000).
A. M. E. Marchand, C. I. Macaulay, R. S. Haszeldine, and A. E. Fallick, *Pore Water Evolution in Oilfield Sandstones: Constraints from Oxygen Isotope Microanalyses of Quartz Cement,* 191 Chemical Geology 285-304 (2002).
C. Spotl and D. Mattey, *Stable Isotope Microsampling of Speleothems for Palaeoenvironmental Studies: A Comparison of Microdrill, Micromill and Laser Ablation Techniques,* 235 Chemical Geology 48-58 (2006).
Vincent, B., L. Emmanuel, P. Houel, and J. Loreau, *Geodynamic Control on Carbonate Diagenesis: Petrographic and Isotopic Investigation of the Upper Jurassic Formations of the Paris Basin (France),* 197 Sedimentary Geology 267-289 (2007).
T.M. Al-Shaalan, H. Klie, A.H. Dogru, and M.F. Wheeler, *Studies of Robust Two Stage Preconditioners for the Solution of Fully Implicit Multiphase Flow Problems,* SPE 118722, 2009.

* cited by examiner

100

300

400

$$A = \begin{bmatrix}
a_{1,1} & a_{1,2} & & & a_{1,5} & a_{1,6} & & & & & & & & & & \\
a_{2,1} & a_{2,2} & a_{2,3} & & & a_{2,6} & a_{2,7} & & & & & & & & & \\
 & a_{3,2} & a_{3,3} & a_{3,4} & & & a_{3,7} & a_{3,8} & & & & & & & & \\
 & & a_{4,3} & a_{4,4} & & & & a_{4,8} & & & & & & & & \\
a_{5,1} & & & & a_{5,5} & a_{5,6} & & & a_{5,9} & & & & & & & \\
a_{6,1} & a_{6,2} & & & a_{6,5} & a_{6,6} & a_{6,7} & & a_{6,9} & a_{6,10} & & & & & & \\
 & a_{7,2} & a_{7,3} & & & a_{7,6} & a_{7,7} & a_{7,8} & & a_{7,10} & a_{7,11} & & & & & \\
 & & a_{8,3} & a_{8,4} & & & a_{8,7} & a_{8,8} & & & a_{8,11} & a_{8,12} & & & & \\
 & & & & a_{9,5} & a_{9,6} & & & a_{9,9} & a_{9,10} & & & a_{9,13} & a_{9,14} & & \\
 & & & & & a_{10,6} & a_{10,7} & & a_{10,9} & a_{10,10} & a_{10,11} & & & a_{10,14} & a_{10,15} & \\
 & & & & & & a_{11,7} & a_{11,8} & & a_{11,10} & a_{11,11} & a_{11,12} & & & a_{11,15} & a_{11,16} \\
 & & & & & & & a_{12,8} & & & a_{12,11} & a_{12,12} & & & & a_{12,16} \\
 & & & & & & & & a_{13,9} & & & & a_{13,13} & a_{13,14} & & \\
 & & & & & & & & a_{14,9} & a_{14,10} & & & a_{14,13} & a_{14,14} & a_{14,15} & \\
 & & & & & & & & & a_{15,10} & a_{15,11} & & & a_{15,14} & a_{15,15} & a_{15,16} \\
 & & & & & & & & & & a_{16,11} & a_{16,12} & & & a_{16,15} & a_{16,16}
\end{bmatrix}$$

$$B_0 = \begin{bmatrix} b_{1,1}^{(0)} & & & & & & & & & & & & & & & \\ & b_{2,2}^{(0)} & & & & & & & & & & & & & & \\ & & b_{3,3}^{(0)} & b_{3,4}^{(0)} & & & & & & & & & & & & \\ & & b_{4,3}^{(0)} & b_{4,4}^{(0)} & & & & b_{4,8}^{(0)} & & & & & & & & \\ & & & & b_{5,5}^{(0)} & b_{5,6}^{(0)} & & & b_{5,9}^{(0)} & & & & & & & \\ & & & & b_{6,5}^{(0)} & b_{6,6}^{(0)} & & & & & & & & & & \\ & & & & & & b_{7,7}^{(0)} & b_{7,8}^{(0)} & & b_{7,10}^{(0)} & b_{7,11}^{(0)} & & & & & \\ & & & b_{8,4}^{(0)} & & & b_{8,7}^{(0)} & b_{8,8}^{(0)} & & & b_{8,11}^{(0)} & b_{8,12}^{(0)} & & & & \\ & & & & b_{9,5}^{(0)} & & & & b_{9,9}^{(0)} & b_{9,10}^{(0)} & & & & & & \\ & & & & & & b_{10,7}^{(0)} & & b_{10,9}^{(0)} & b_{10,10}^{(0)} & b_{10,11}^{(0)} & & & & b_{10,15}^{(0)} & \\ & & & & & & b_{11,7}^{(0)} & b_{11,8}^{(0)} & & b_{11,10}^{(0)} & b_{11,11}^{(0)} & b_{11,12}^{(0)} & & & & b_{11,16}^{(0)} \\ & & & & & & & b_{12,8}^{(0)} & & & b_{12,11}^{(0)} & b_{12,12}^{(0)} & & & & b_{12,16}^{(0)} \\ & & & & & & & & & & & & b_{13,13}^{(0)} & & & \\ & & & & & & & & & & & & & b_{14,14}^{(0)} & & \\ & & & & & & & & & b_{15,10}^{(0)} & & & & & b_{15,15}^{(0)} & b_{15,16}^{(0)} \\ & & & & & & & & & & b_{16,11}^{(0)} & b_{16,12}^{(0)} & & & b_{16,15}^{(0)} & b_{16,16}^{(0)} \end{bmatrix}$$

900
FIG. 9

$$B_0 = \begin{bmatrix} b^{(0)}_{3,3} & b^{(0)}_{3,4} & & & & & & & & & & & & & & \\ b^{(0)}_{4,3} & b^{(0)}_{4,4} & & & b^{(0)}_{4,8} & & & & & & & & & & & \\ & & b^{(0)}_{5,5} & b^{(0)}_{5,6} & & & & b^{(0)}_{5,9} & & & & & & & & \\ & & b^{(0)}_{6,5} & b^{(0)}_{6,6} & & & & & & & & & & & & \\ & & & & b^{(0)}_{7,7} & b^{(0)}_{7,8} & & & b^{(0)}_{7,10} & b^{(0)}_{7,11} & & & & & & \\ & b^{(0)}_{8,4} & & b^{(0)}_{8,7} & b^{(0)}_{8,8} & & & & b^{(0)}_{8,11} & b^{(0)}_{8,12} & & & & & \\ & & b^{(0)}_{9,5} & & & & b^{(0)}_{9,9} & b^{(0)}_{9,10} & & & & & & & \\ & & & & b^{(0)}_{10,7} & & b^{(0)}_{10,9} & b^{(0)}_{10,10} & b^{(0)}_{10,11} & & & & b^{(0)}_{10,15} & & & \\ & & & & b^{(0)}_{11,7} & b^{(0)}_{11,8} & & b^{(0)}_{11,10} & b^{(0)}_{11,11} & b^{(0)}_{11,12} & & & & b^{(0)}_{11,16} & & \\ & & & & & b^{(0)}_{12,8} & & & b^{(0)}_{12,11} & b^{(0)}_{12,12} & & & & b^{(0)}_{12,16} & & \\ & & & & & & & b^{(0)}_{15,10} & & & & b^{(0)}_{15,15} & b^{(0)}_{15,16} & & & \\ & & & & & & & b^{(0)}_{16,11} b^{(0)}_{16,12} & & b^{(0)}_{16,15} & b^{(0)}_{16,16} & & & & b^{(0)}_{1,1} & \\ & & & & & & & & & & & & & & b^{(0)}_{2,2} & \\ & & & & & & & & & & & & & & & b^{(0)}_{13,13} \\ & & & & & & & & & & & & & & & & b^{(0)}_{14,14} \end{bmatrix}$$

$$A_1 = \begin{bmatrix} b^{(0)}_{3,3} & b^{(0)}_{3,4} & & & & & & & & & & & & & \\ b^{(0)}_{4,3} & b^{(0)}_{4,4} & & & & b^{(0)}_{4,8} & & & & & & & & & \\ & & b^{(0)}_{5,5} & b^{(0)}_{5,6} & & & & b^{(0)}_{5,9} & & & & & & & \\ & & b^{(0)}_{6,5} & b^{(0)}_{6,6} & & & & & & & & & & & \\ & & & & b^{(0)}_{7,7} & b^{(0)}_{7,8} & & & b^{(0)}_{7,10} & b^{(0)}_{7,11} & & & & & \\ & b^{(0)}_{8,4} & & & b^{(0)}_{8,7} & b^{(0)}_{8,8} & & & & b^{(0)}_{8,11} & b^{(0)}_{8,12} & & & & \\ & & b^{(0)}_{9,5} & & & & & b^{(0)}_{9,9} & b^{(0)}_{9,10} & & & & & & \\ & & & & b^{(0)}_{10,7} & & b^{(0)}_{10,9} & b^{(0)}_{10,10} & b^{(0)}_{10,11} & & & & b^{(0)}_{10,15} & & \\ & & & & b^{(0)}_{11,7} & b^{(0)}_{11,8} & & b^{(0)}_{11,10} & b^{(0)}_{11,11} & b^{(0)}_{11,12} & & & & & b^{(0)}_{11,16} \\ & & & & & b^{(0)}_{12,8} & & & b^{(0)}_{12,11} & b^{(0)}_{12,12} & & & & & b^{(0)}_{12,16} \\ & & & & & & & b^{(0)}_{15,10} & & & & & b^{(0)}_{15,15} & b^{(0)}_{15,16} \\ & & & & & & & & & b^{(0)}_{16,11} & b^{(0)}_{16,12} & & & b^{(0)}_{16,15} & b^{(0)}_{16,16} \end{bmatrix}$$

$$B_1 = \begin{bmatrix} b_{3,3}^{(1)} & & & & & & & & & & & & & & & \\ & b_{4,4}^{(1)} & & & & & & b_{4,8}^{(1)} & & & & & & & & \\ & & b_{5,5}^{(1)} & & & & & & & & & & & & & \\ & & & b_{6,6}^{(1)} & & & & & & & & & & & & \\ & & & & & & b_{7,7}^{(1)} & b_{7,8}^{(1)} & & b_{7,10}^{(1)} & b_{7,11}^{(1)} & & & & & \\ & & & b_{8,4}^{(1)} & & & b_{8,7}^{(1)} & b_{8,8}^{(1)} & & & & b_{8,12}^{(1)} & & & & \\ & & & & & & & & b_{9,9}^{(1)} & b_{9,10}^{(1)} & & & & & & \\ & & & & & & b_{10,7}^{(1)} & & b_{10,9}^{(1)} & b_{10,10}^{(1)} & b_{10,11}^{(1)} & & & & b_{10,15}^{(1)} & \\ & & & & & & b_{11,7}^{(1)} & & & b_{11,10}^{(1)} & b_{11,11}^{(1)} & b_{11,12}^{(1)} & & & & \\ & & & & & & & b_{12,8}^{(1)} & & & b_{12,11}^{(1)} & b_{12,12}^{(1)} & & & & \\ & & & & & & & & & b_{15,10}^{(1)} & & & & & b_{15,15}^{(1)} & \\ & & & & & & & & & & & & & & & b_{16,16}^{(1)} \end{bmatrix}$$

$$B_1 = \left[\begin{array}{ccccccccccc|ccccc} b_{4,4}^{(1)} & & & b_{4,8}^{(1)} & & & & & & & & & & & & \\ & b_{7,7}^{(1)} & b_{7,8}^{(1)} & & b_{7,10}^{(1)} & b_{7,11}^{(1)} & & & & & & & & & & \\ b_{8,4}^{(1)} & b_{8,7}^{(1)} & b_{8,8}^{(1)} & & & & b_{8,12}^{(1)} & & & & & & & & & \\ & & & b_{9,9}^{(1)} & b_{9,10}^{(1)} & & & & & & & & & & & \\ & b_{10,7}^{(1)} & & b_{10,9}^{(1)} & b_{10,10}^{(1)} & b_{10,11}^{(1)} & & b_{10,15}^{(1)} & & & & & & & & \\ & b_{11,7}^{(1)} & & & b_{11,10}^{(1)} & b_{11,11}^{(1)} & b_{11,12}^{(1)} & & & & & & & & & \\ & & b_{12,8}^{(1)} & & & b_{12,11}^{(1)} & b_{12,12}^{(1)} & & & & & & & & & \\ \hline & & & & b_{15,10}^{(1)} & & & b_{15,15}^{(1)} & & & & & & & & \\ & & & & & & & & b_{3,3}^{(1)} & & & & & & & \\ & & & & & & & & & b_{5,5}^{(1)} & & & & & & \\ & & & & & & & & & & b_{6,6}^{(1)} & & & & & \\ & & & & & & & & & & & b_{16,16}^{(1)} & & & & \end{array}\right]$$

$$A_2 = \begin{bmatrix} b_{4,4}^{(1)} & & & b_{4,8}^{(1)} & & & & & & & \\ & b_{7,7}^{(1)} & b_{7,8}^{(1)} & & b_{7,10}^{(1)} & b_{7,11}^{(1)} & & & & \\ b_{8,4}^{(1)} & b_{8,7}^{(1)} & b_{8,8}^{(1)} & & & & & b_{8,12}^{(1)} & & \\ & & & b_{9,9}^{(1)} & b_{9,10}^{(1)} & & & & & \\ & b_{10,7}^{(1)} & & b_{10,9}^{(1)} & b_{10,10}^{(1)} & b_{10,11}^{(1)} & & & b_{10,15}^{(1)} \\ & b_{11,7}^{(1)} & & & b_{11,10}^{(1)} & b_{11,11}^{(1)} & b_{11,12}^{(1)} & & \\ & & b_{12,8}^{(1)} & & & b_{12,11}^{(1)} & b_{12,12}^{(1)} & & \\ & & & & b_{15,10}^{(1)} & & & & b_{15,15}^{(1)} \end{bmatrix}$$

$$B_2 = \begin{bmatrix} b^{(2)}_{4,4} & & & & & & & & \\ & b^{(2)}_{7,7} & b^{(2)}_{7,8} & & b^{(2)}_{7,10} & & & & \\ & b^{(2)}_{8,7} & b^{(2)}_{8,8} & & & & & & \\ & & & b^{(2)}_{9,9} & b^{(2)}_{9,10} & & & & \\ & b^{(2)}_{10,7} & & b^{(2)}_{10,9} & b^{(2)}_{10,10} & & & & \\ & & & & & b^{(2)}_{11,11} & & & \\ & & & & & & b^{(2)}_{12,12} & & \\ & & & & & & & & b^{(2)}_{15,15} \end{bmatrix}$$

1700

1800

$$A_3 = \begin{bmatrix} b_{8,8}^{(2)} & b_{8,7}^{(2)} & & & \\ b_{7,8}^{(2)} & b_{7,7}^{(2)} & b_{7,10}^{(2)} & & \\ & b_{10,7}^{(2)} & b_{10,10}^{(2)} & b_{10,9}^{(2)} \\ & & b_{9,10}^{(2)} & b_{9,9}^{(2)} \end{bmatrix}$$

METHOD AND SYSTEM FOR PARALLEL MULTILEVEL SIMULATION

CROSS-REFERENCE TO RELATED APPLICATIONS

This application is a National Stage of International Application No. PCT/US2011/033793 filed Apr. 25, 2011, which claims the benefit of Provisional Patent Application 61/367,713, filed Jul. 26, 2010 entitled METHOD AND SYSTEM FOR PARALLEL MULTILEVEL SIMULATION, the entireties of which are incorporated by reference herein.

FIELD OF THE INVENTION

Exemplary embodiments of the present techniques relate to a method for simulating a property of at least one fluid in a fluid-containing physical system. The physical system can be represented by a multiplicity of volumetric cells and a multiplicity of connections between cells.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Modern society is greatly dependant on the use of hydrocarbons for fuels and chemical feedstocks. Hydrocarbons are generally found in subsurface rock formations that can be termed "reservoirs." Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "simulation models" are used to simulate hydrocarbon reservoirs and optimize the production of the hydrocarbons. A simulation model is a type of computational fluid dynamics simulation where a set of partial differential equations (PDE's) which govern multiphase, multi-component fluid flow through porous media and the connected facility network is approximated and solved. This is an iterative, time-stepping process where a particular hydrocarbon production strategy is optimized.

Simulation models map the underlying partial differential equations on a structured (or unstructured) grid, which may be termed discretization. The grid, which may be termed a computational mesh, represents the reservoir rock, wells, and surface facility network. State variables, such as pressure and saturation, are defined at each grid block. The goal of a simulation model is generally to understand the flow patterns of the underlying geology in order to optimize the production of hydrocarbons from a set of wells and surface facilities. During the past five decades, the size and complexity of simulation models have grown proportionally with the increased availability of computing capacity. Complex simulation models often require the use of parallel computing systems and algorithms to provide adequate simulation turnaround time.

Reservoir simulation is of great interest because it infers the behavior of a real hydrocarbon-bearing reservoir from the performance of a model of that reservoir. The typical objective of reservoir simulation is to understand the complex chemical, physical and fluid flow processes occurring in the reservoir sufficiently well to predict future behavior of the reservoir to maximize hydrocarbon recovery. Reservoir simulation may often refer to the hydrodynamics of flow within a reservoir, but, in a larger sense, reservoir simulation can also refer to a total hydrocarbon system. This may include not only the reservoir, but also injection and/or production wells, surface flow lines, and surface processing facilities. Reservoir simulation calculations in such hydrocarbon systems can be based on simulations of fluid flow throughout the entire system. These calculations are performed with varying degrees of rigor, depending on the requirements of the particular simulation study and the capabilities of the simulation software being used.

The principle of numerical simulation is to numerically solve equations describing a physical phenomenon using a computer. Such equations are generally algebraic equations, ordinary differential equations (ODE), and/or partial differential equations (PDE). As a means for solving differential equations, ODE and/or PDE, numerically, there are known methods such that the finite difference method, the finite volume method, the finite element method, and the like. Regardless of which method is used, the physical system to be modeled is divided into cells, a set of which is called a grid or mesh, and the state variables that vary in time and in space throughout the model are represented by sets of values for each cell. The reservoir rock properties such as porosity and permeability are typically assumed constant inside a cell. Other variables such as fluid pressure and phase saturation are defined at specified points, sometime called nodes, within the cell (or sometimes on the boundaries between the cells). A link between two nodes is called a "connection." Fluid flow between two cells is typically modeled as flow along the connection between them.

Most reservoir simulators use so-called structured grids in which the cells are assumed to be three-dimensional rectangular shapes distorted to conform as well as possible to geological features and flow patterns. Certain geological features and modeling situations cannot be represented well by structured grids. For example, slanted wells, faults, or fractures, which can naturally occur in the reservoir models, are almost impossible to model using structured grids.

These shortcomings can be overcome in part by using local refinement, in which selected cells are subdivided into smaller cells, and non-neighbor connections, which allow flow between cells that are physically adjacent to each other but are not adjacent in the data structure. A more powerful solution to this problem is to exploit the flexibility provided by layered unstructured grids, when a computational domain is split into geological layers and, in each layer, a grid is formed by a number of laterally contiguous grid cells. The cells forming any layer have corresponding neighbors in the layers located above and below the current one. Such a grid usually is called "2.5D grid."

Even such grids are not sufficient to describe all the variability of complex geologic structures present in real hydrocarbon reservoirs such as branching wells, complex Y-faults, or pinch-outs, i.e. cases when the geological layer disappear inside the reservoir. The only solution to this problem is to exploit the flexibility provided by an unstructured grid.

In a simulation, a set of equations is developed to express the fundamental principles of conservation of mass, energy, and/or momentum within each cell and of movement of mass, energy, and/or momentum between cells. The replacement of the state variables that vary in space throughout a model by a finite number of variable values for each cell is called "discretization." For proper resolution of the modeled physical processes, hundreds of thousands and even millions of cells may be required. That may lead to the millions of equations to be solved.

In order to analyze a phenomenon changing in time, it is necessary to calculate physical quantities at discrete intervals of time called time steps, irrespective of the continuously changing conditions as a function of time. Time-dependent modeling of the transport processes therefore proceeds in a sequence of time steps. During a time step, transport of various kinds occurs between cells. Through this transport, a cell can exchange mass, momentum, or energy with other nearby cells.

The equations governing the behavior of each cell during a time step couple the mass, momentum, and energy conservation principles to the transport equations. At every time step, the simulator must solve one, or more, large matrix equations, Ax=b, where A is a matrix, b is a known right hand side vector, and x is a vector of unknowns, with the number of unknowns depending on the type of time step computation method being used. Because matrix equations are quite large, having at least one equation per cell, they are solved iteratively except in case of small models.

Various time step computations have been proposed for reservoir simulation. Two most commonly used calculation methods are called "IMPES" and "Fully Implicit." In the IMPES method, which is derived from the term "implicit-pressure, explicit-saturation," flows between neighboring cells are computed based on pressures at their values at the end of the time step. The pressures at the end of the IMPES time step are interdependent and must be determined simultaneously. This method is called "implicit" because each pressure depends on other quantities that are known only implicitly. The basic procedure is to form a matrix equation, $Ax_p=b_p$, that is implicit in pressures only, solve the matrix equation for the pressures $x_p$, and then use the pressures in computing saturations explicitly cell by cell. In this fashion, after the pressures have been advanced in time, the saturations are updated explicitly. After the saturations are calculated, updated physical properties such as relative permeability's and capillary pressures can be calculated. Those are explicitly used at the next time step. Similar treatment can be used for other possible solution variables such as concentrations, component masses, temperature, or internal energy.

The fully implicit method treats both pressure and saturations implicitly. Flow rates are computed using phase pressures and saturations at the end of each time step. The calculation of flow rates, pressures, and saturations involves the solution of nonlinear equations using a suitable iterative technique. At each iteration, the method constructs and solves a matrix equation, the unknowns of which (pressure and saturations) change over the iteration:

$$\begin{bmatrix} A_{pp} & A_{ps} \\ A_{sp} & A_{ss} \end{bmatrix} \begin{bmatrix} x_p \\ x_s \end{bmatrix} = \begin{bmatrix} b_p \\ b_s \end{bmatrix}.$$

The matrix of this matrix equation is often called "Jacobian." As the pressures and saturations are solved, the updating of these terms continues using new values of pressure and saturation. The iteration process terminates when predetermined convergence criteria are satisfied. Further information about reservoir simulation and computation techniques may be found in D. W. Peaceman, *Fundamentals of Numerical Reservoir Simulation*, Elsevier, N.Y., 1977; K. Aziz and A. Settari, *Petroleum Reservoir Simulation*, Applied Science Publishers Ltd, Barking, Essex, England, 1979; C. C. Mattax and R. L. Dalton, *Reservoir Simulation, Monograph*, Volume 13, Society of Petroleum Engineers, 1990; U.S. Pat. No. 6,052,520 to J. W. Watts; and U.S. Pat. No. 6,662,146 to J. W. Watts. As mentioned above the matrix equations obtained after discretization of the governing equations for reservoir simulation may have hundreds of thousands and even millions of unknowns. In practice, such systems can be solved only by iterative methods. See, for example, Y. Saad, *Iterative Methods for Sparse Linear Systems*, 2nd ed., Society for Industrial and Applied Mathematics (SIAM), 2003. The convergence rate of iterative methods and hence, the time spent on solving such systems, depend on the property of the matrices which is called condition number. The usual way to reduce the computational time is to reduce the condition number by employing a preconditioner B that is rewriting the system using the equation:

$$B^{-1}Ax=B^{-1}b.$$

In this equation, matrix B provides reasonable approximations to matrix A. Further, matrix B can be inexpensively inverted.

There are many different preconditioners for preconditioned iterative methods to solve matrix equations arising in reservoir simulation. Some of them can be applied only to the problems approximated on structured (See, e.g., P. T. Woo, S. J. Roberts, and F. G. Gustavson, *Application of Sparse Matrix Techniques in Reservoir Simulation*, SPE 4544, 1973) or almost structured grids (European Patent Application EP 2 068 263) and hence cannot be applied in case of generic unstructured grids. Some other methods apply incomplete LU factorizations (U.S. Pat. No. 6,230,101 B1 to J. R. Wallis) or singular value decomposition (SVD) reduction (U.S. Patent Application Publication No. 2007/0255779), both hardly parallelizable. Algebraic multigrid (AMG) methods are known to be most efficient methods of solving reservoir matrix equations. T. Clees and L. Ganzer, *An Efficient Algebraic Multigrid Solver Strategy for Adaptive Implicit Methods in Oil Reservoir Simulation*, SPE 105789, 2007. Unfortunately, the coarsening process of the AMG method applied directly to the reservoir matrix A may lead to the matrices with the increased nonzero patterns on the coarser levels, especially for non-symmetric problems, which can be not very useful for efficient parallelization. Much better approach is to combine multiplicatively a version of block-ILU0 preconditioner for the full system with an AMG cycle for the pressure block. T. M. Al-Shaalan, H. Klie, A. H. Dogru, and M. F. Wheeler, *Studies of Robust Two Stage Preconditioners for the Solution of Fully Implicit Multiphase Flow Problems*, SPE 118722, 2009; J. M. Gratien, T. Guignon, J. F. Magras, P. Quandalle, and O. Ricois, *Scalability and Load-Balancing Problems in Parallel Reservoir Simulation*, SPE 106023, 2007. This combinative approach is known as the "constrained pressure residual" (CPR) technique.

Because general-purpose computing in reservoir simulation can require substantial computing resources, proposals have been made to subdivide a simulation model into smaller segments and to perform computations in parallel on multi-processor computer or cluster of (possibly multi-processor) computing nodes. The principal attraction of parallel computing is the ability to reduce the elapsed time of simulation, ideally by a factor of N for an N-processor computing system. Parallel computing falls short of the ideal because of several factors, including recursion in linear equation solution, the overhead associated with message passing required for various computations, and load imbalances due to heterogeneities in the problem physics and characterization of the hydrocarbon fluids.

There are several approaches to constructing parallel preconditioners for linear problems arising in reservoir simulation. Most of them are based on overlapping domain decomposition. O. Dubois, I. D. Mishev, and L. Zikatanov, *Energy Minimizing Bases for Efficient Multiscale Modeling and Linear Solvers in Reservoir Simulation*, SPE 119137, 2009; U.S. Pat. No. 7,516,056 to J. Wallis, et al.; P. Lu, J. S. Shaw, T. K. Eccles, I. D. Mishev, and B. L. Beckner, *Experience with Numerical Stability, Formulation and Parallel Efficiency of Adaptive Implicit Methods*, SPE 118977, 2009. The basic idea of this method is that the computational domain is split into (non-overlapping) subdomains and each subdomain is assigned to a different processing unit of a parallel computer. Then each subdomain is extended by one or several layers of neighboring cells to get overlap. On each subdomain, the reservoir matrix is restricted to the cells of that (extended) subdomain. The local problems then can be computed in parallel by different processors using any existing technique (e.g. ILU or AMG) and the global solution is obtained by special type superposition of the local solutions from each subdomain. Generally, the convergence of the iterative method with overlapping domain decomposition is independent of the mesh size when the width of the overlapping region is kept proportional to the diameter of the subdomains. However, the convergence deteriorates linearly as the number of subdomains increases, preventing the method to be scalable. To remedy this problem, a coarse component can be added to the preconditioner, which allows for a global mean computation and communication across all subdomains. Such a two-level preconditioner is closely related to a multigrid (a two-grid) method, but in which the coarse space is generally much coarser compared to the fine grid. The performance of this type of preconditioner depends strongly on the decomposition of the domain.

U.S. Patent Application Publication No. 2007/0010979 by Wallis, et al., discloses an overlapping domain decomposition with one layer of overlap but special procedure for implementation of multigrid method. The connections between any two adjacent subdomains are lamped together with no regard of their respective values. Even though the method claims the efficiency of the obtained in such a way preconditioner is good, there is an overhead connected with small connections (by value) as they are transferred to the coarser levels.

The approach disclosed in U.S. Patent Application Publication No. 2006/0245667 by Fung, et al., can be applied to structured grid, 2.5D grid, or the combination of both as long as the resulting grid has layered structure. The method is claimed to work on a variety of computer platforms, such as shared-memory computers, distributed memory computers, or personal computer clusters. The approach heavily depends on the assumption of layered structure of the underlying grid. It splits computational domain laterally into vertical columns and distributes the split parts into separate computational nodes. The method described in that patent cannot be applied to the reservoir simulation models defined on general unstructured grids or can use any other type of partitioning of the grid cells between the computational nodes.

All the approaches described above employ a Krylov-type iterative solver like gradient minimal residual (GMRES) or a biconjugate gradient stabilized (BiCGStab). See Saad, Y., *Iterative Methods for Sparse Linear Systems*, 2nd ed., Society for Industrial and Applied Mathematics (SIAM), 2003. One of the properties of these solvers is that on each iteration there is a need to compute two or more inner products. In distributed parallel environment that means that for each iteration a small amount of information should be distributed globally between all the processors. However, global message passing has bad scalability, e.g., its cost grows as the number of processing units involved in the computations increases. See Message Passing Interface Forum, *MPI: A Message-Passing Interface Standard, Version 2.1* (June 2008). Moreover, this global transfer of information enforces natural barriers, which may also create additional misbalance in computations.

Thus, when domain decomposition or multigrid method is used on the parallel system with multiple CPUs, the information should be exchanged on each iteration between neighbor CPUs and globally, between all CPUs. In addition, multigrid methods are based on reduction in the number of unknowns in matrix equation, which usually leads to the increased number of connections between unknowns on the coarser levels, which in turn increases the cost of exchange of the information between CPUs during each iteration.

Addressing the aforementioned issues may lead to more efficient methods of solving sparse matrix equations for reservoir models on parallel computers with multiple CPUs. Namely, an iterative method, which limits or avoids global communications between CPUs may be more efficient than methods that propagate information globally. A multigrid method that is capable of controlling the number of connections between unknowns on coarser levels will be more efficient than the one in which the number of connections grows uncontrollably.

SUMMARY

An exemplary embodiment of the present techniques provides a method of performing a reservoir simulation. The method includes generating a data representation in a storage system, wherein the data representation includes an interconnection weight that represents the magnitude of an interconnection between each of a number of computational cells in a computational mesh. A threshold value is compared to each interconnection weight and any interconnection weight that is equal to or less than the threshold value is set to zero.

The method may include determining the threshold value by calculating a maximum interconnection weight for interconnections of each of the number of computational cells to all adjoining computational cells. The largest value of the maximum interconnection weight is identified for all of the plurality of computational cells. The smallest value of the maximum interconnection weights for all of the plurality of computational cells. The threshold value is selected to lie between the largest value and the smallest value. The threshold value may be an average of the largest value and the smallest value.

The data representation may include a matrix in which each diagonal element represents one of the plurality of computational cells in the computational mesh, and the method further includes generating the interconnection weights between each of the plurality of computational cells from off-diagonal elements in the matrix. Comparing the threshold value to each interconnection weight, and, for each of the plurality of computational cells that have an interconnection weight equal to or less than the threshold value, setting the off-diagonal elements to zero. Any rows in the matrix that have no remaining off-diagonal elements are eliminated to generate a lower level matrix.

One or more additional lower level of matrices may be created by iterating through the determination of a new threshold value, followed by generating interconnection weights from the off-diagonal elements for each computational cell in the lower level matrix. At each iteration, the threshold value is compared to each interconnection weight, and, for each computational cell in the lower level matrix that has an interconnection weight equal to or less than the threshold value, the off-diagonal elements are set to zero. Any rows in the lower level matrix that have no remaining off-diagonal elements are set to zero to generate a lower level matrix. A preconditioner may be generated by restricting the solution to the lower level matrix. Further, a preconditioner may be created by iteratively restricting the solution to each higher level matrix, starting from a lowest level matrix, and proceeding to a highest level matrix.

The method may also include generating a lower level computational mesh in the storage system by eliminating any one of the plurality of computational cells from the computational mesh that has no interconnections to other computational cells. The method may include generating a sequence of lower level computational meshes in the storage system by iteratively: generating a new threshold value for the lower level computational mesh; comparing a threshold value to each interconnection weight and setting any interconnection weight that is equal to or less than the threshold value to zero; and eliminating any computational cell from the computational mesh that has no interconnections to other computational cells to create a next lower level computational mesh.

The method may include generating a preconditioner that restricts a solution to a lowest level computational mesh; and, iteratively, generating a preconditioner that restricts the solution to a next higher computational mesh until a highest level computational mesh is reached. The preconditioner may be used in a Krylov-type iterative method to perform a reservoir simulation. The Krylov-type iterative method may include a gradient minimal residual (GMRES) method or a biconjugate gradient stabilized (BiCGStab) method.

Another exemplary embodiment of the present techniques provides a method for managing hydrocarbon production from a reservoir. The method includes simplifying a computational mesh by generating a data representation of the computational mesh in a storage system, wherein the data representation comprises an interconnection weight that represents the magnitude of an interconnection between each of a number of computational cells in the computational mesh. A threshold value is compared to each interconnection weight and any interconnection weight that is equal to or less than the threshold value is set to zero. Any of the number of computational cells that have no interconnections to other computational cells are eliminated to create a lower level computational mesh. A preconditioner is generated by restricting a solution to the lower level computational mesh. A hydrocarbon reservoir is simulated using the preconditioner.

The method may include generating a sequence of lower level computational meshes in the storage system by iteratively generating a new threshold value for the lower level computational mesh. At each iteration, a threshold value is compared to each interconnection weight and any interconnection weight that is equal to or less than the threshold value is set to zero. Any computational cell in the computational mesh that has no interconnections to other computational cells is eliminated to create a next lower level computational mesh. A preconditioner that restricts a solution to a lowest level computational mesh is generated. A preconditioner is iteratively generated by restricting a solution to a next higher computational mesh until a highest level computational mesh is reached.

The method may also include identifying new locations for production wells or injection wells based, at least in part, upon a result from the simulation of the hydrocarbon reservoir. The method may include determining whether to convert a production well into an injection well, convert an injection well into a production well, or any combinations thereof, based, at least in part, on a result from the simulation of the hydrocarbon reservoir.

Another exemplary embodiment of the present techniques provides a non-transitory, computer readable medium that comprises code. The code can be configured to direct a processor to generate a data representation in a storage system, wherein the data representation comprises an interconnection weight that represents the magnitude of an interconnection between each of a number of computational cells in a computational mesh. The code can direct the processor to compare a threshold value to each interconnection weight, and set any interconnection weight that is equal to or less than the threshold value to zero.

The non-transitory, computer readable medium may also include code configured to direct the processor to calculate a maximum interconnection weight for interconnections of each of the plurality of computational cells to all adjoining computational cells. The code may direct the processor to identify the largest value of the maximum interconnection weight for all of the plurality of computational cells, identify the smallest value of the maximum interconnection weight for all of the plurality of computational cells, and select the threshold value to lie between the largest value and the smallest value.

The non-transitory, computer readable medium may also include a matrix in which each diagonal element represents one of the plurality of computational cells in the computational mesh. Further, the non-transitory, computer readable medium can include code configured to direct the processor to generate the interconnection weights between each of the number of computational cells from off-diagonal elements in the matrix. The code directs the processor to compare the threshold value to each interconnection weight, and for each computational cell that has an interconnection weight equal to or less than the threshold value, to set the off-diagonal elements to zero. The code can also direct the processor to eliminate any rows in the matrix that have no remaining off-diagonal elements to generate a lower level matrix. Further, the non-transitory, computer readable medium can include code configured to direct the processor to construct a preconditioner by restricting the solution to a lower level matrix.

BRIEF DESCRIPTION OF THE DRAWINGS

The advantages of the present techniques are better understood by referring to the following detailed description and the attached drawings, in which:

FIG. 5 is a Jacobian matrix, generated from the computational mesh shown in FIG. 4, in which the off-diagonal elements correspond to interconnections between computational cells;

FIG. 9 shows a matrix B constructed from the computational mesh of FIG. 8;

FIG. 10 shows a sorted version of the matrix B from FIG. 9;

FIG. 11 is a new coarse grid matrix $A_1=B_{11}$ of FIG. 10, in which $B_{22}$ has been dropped;

FIG. 13 is the matrix $B_1$ created from computational mesh of FIG. 12;

FIG. 14 shows the reordered matrix $B_1$ created from the matrix of FIG. 13;

FIG. 15 shows an example of matrix $A_2$ obtained from matrix $B_1$ after the diagonal matrix $B_{22}$ has been dropped;

FIG. 19 shows an example of matrix $A_3$ obtained from matrix $B_2$ after dropping the diagonal elements $B_{22}$;

DETAILED DESCRIPTION

Figure 1:
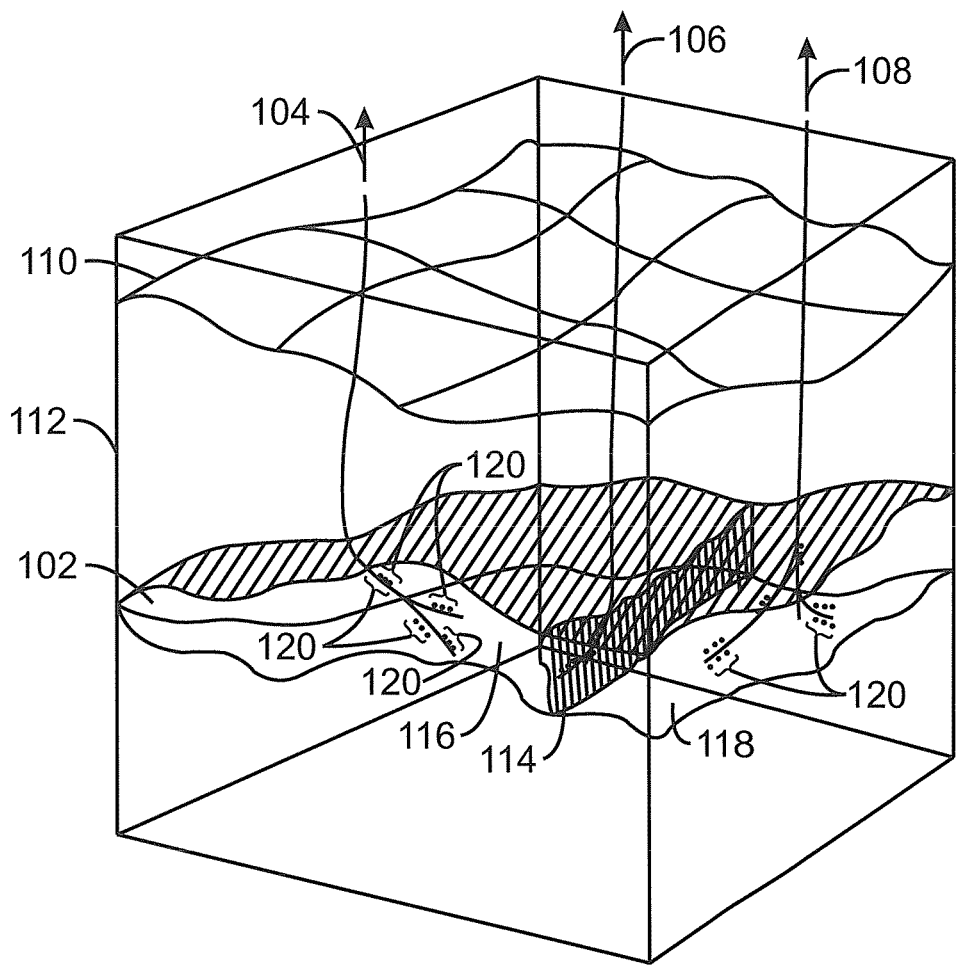
FIG. 1 is a schematic view of a reservoir.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition that persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Coarsening" refers to reducing the number of cells in simulation models by making the cells larger, for example, representing a larger space in a reservoir. Coarsening is often used to lower the computational costs by decreasing the number of cells in a geologic model prior to generating or running simulation models.

"Non-transitory, computer-readable medium" as used herein refers to any tangible, non-transitory, storage medium that provides instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like.

"Exemplary" is used exclusively herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water, and gas), energy, and momentum through a physical system using a computer. The physical system includes a three dimensional reservoir model, fluid properties, and the numbers and locations of wells. The three-dimensional reservoir model is represented by a computational mesh, which has a number of computational cells representing the smallest indivisible units in the simulation. As used herein, the terms "computational cell" and "cell" are interchangeable. Flow simulations also require a strategy (often called a well-management strategy) for controlling injection and production rates. These strategies are typically used to maintain reservoir pressure by replacing produced fluids with injected fluids (for example, water, and/or gas). When a flow simulation correctly recreates a past reservoir performance, it is said to be "history matched," and a higher degree of confidence is placed in its ability to predict the future fluid behavior in the reservoir.

"Permeability" is the capacity of a rock to transmit fluids through the interconnected pore spaces of the rock. Permeability may be measured using Darcy's Law: $Q=(k \Delta P A)/(\mu L)$, wherein Q=flow rate ($cm^3/s$), $\Delta P$=pressure drop (atm) across a cylinder having a length L (cm) and a cross-sectional area A ($cm^2$), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. An impermeable layer generally has a permeability of less than about 0.1 millidarcy.

"Pore volume" or "porosity" is defined as the ratio of the volume of pore space to the total bulk volume of the material expressed in percent. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

"Reservoir" or "reservoir formations" are typically pay zones (for example, hydrocarbon-producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Simulation model" refers to a specific mathematical representation of a real hydrocarbon reservoir, which may be considered a particular type of geologic model. Simulation models are used to conduct numerical experiments (reservoir simulations) regarding future performance of the field with the goal of determining the most profitable operating strategy. An engineer managing a hydrocarbon reservoir may create many different simulation models, possibly with varying degrees of complexity, in order to quantify the past performance of the reservoir and predict its future performance.

"Transmissibility" refers to a volumetric flow rate between two points at unit viscosity for a given pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for understanding connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, the casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

Overview

The present techniques provide methods and systems for simulating a property of at least one fluid in a fluid-containing physical system, such as a reservoir. The physical system is represented by a multiplicity of volumetric cells and a multiplicity of connections between cells on a computational architecture using multiple computing nodes. Embodiments may use a preconditioned iterative method, which may have less global communication between computing cores than standard Krylov-type iterative techniques, such as gradient minimal residual (GMRES), biconjugate gradient stabilized (BiCGStab), and the like. In an exemplary embodiment, a Chebyshev iteration method is used to model the physical system. Based on the estimates of the spectrum boundaries, i.e., the extreme Eigen values, this method does not need a global exchange of information. In many cases the spectrum boundaries can be obtained by local evaluations with very small exchange of information between computing cores, which need to be done once per the entire solve.

In embodiments, a multilevel (or multigrid) preconditioner may be recursively constructed by recursively performing a series of steps. First, the number of nonzero elements of a matrix representing the physical system may be reduced based on the strength of connections between them (e.g., using the transmissibilities between computational cells calculated from the matrix values or the matrix values themselves as the measure of that strength). After the reduction of connections, the reduction of unknowns can be applied, resulting in a coarser matrix equation.

The methods can be formulated for both structured and unstructured underlying grids. The methods of the present techniques may be more clearly understood by examining a reservoir simulation, as discussed in FIGS. 1-3.

FIG. 1 is a schematic view 100 of a reservoir 102. The reservoir 102, such as an oil or natural gas reservoir, can be a subsurface formation that may be accessed by drilling wells 104, 106, and 108 from the surface 110 through layers of overburden 112. The reservoir 102 may have one or more faults 114 that divide areas, for example, regions 116 and 118, and which may either restrict or enhance the flow of hydrocarbons. The wells 104, 106, and 108 may be deviated, such as being directionally drilled to follow the reservoir 102. Further, the wells can be branched to increase the amount of hydrocarbon that may be drained from the reservoir, as shown for wells 104 and 108. The wells 104, 106, and 108, can have numerous areas with perforations 120 (indicated as dots next to the wells) to allow hydrocarbons to flow from the reservoir 102 into the wells 104, 106, and 108 for removal to the surface.

Figure 2:
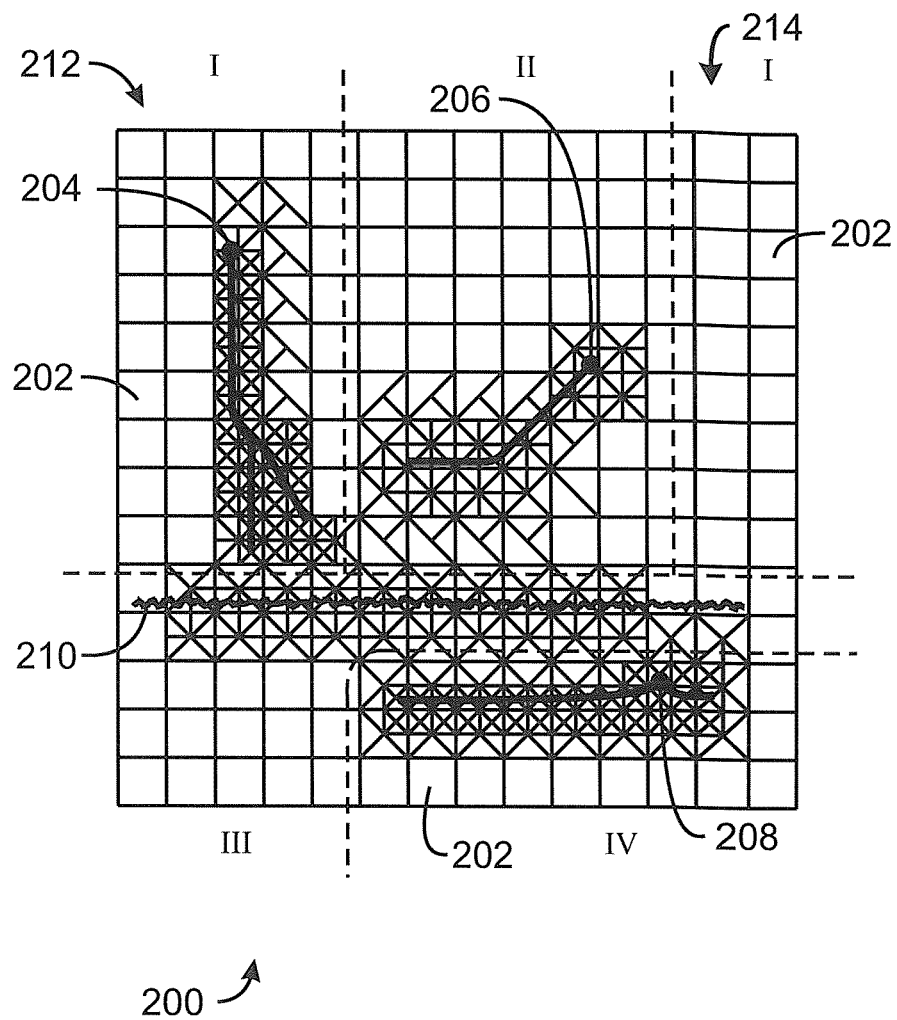
FIG. 2 is a top view of a reservoir showing a planar projection of a computational mesh over the reservoir.

FIG. 2 is a top view of a reservoir showing a planar projection of a computational mesh 200 over the reservoir. Although the computational mesh 200 is shown as a two dimensional grid of computational cells (or blocks) 202 to simplify the explanation of the problem, it should be understood that the actual computational mesh 200 can be a three dimension matrix of computational cells 202 that encompasses the reservoir. A computational cell 202 is a single two or three-dimensional location within a simulation model that represents a physical location in a reservoir. The computational cell 202 may have associated properties, such as porosity or an oil content, which is assumed to be a single value over the entire computational cell 202 and is assigned to the center of the computational cell 202. Computational cells 202 may interact with adjacent computational cells 202, for example, by having flux properties assigned to a shared border with the adjacent computational cells 202. For example, the flux properties may include heat or mass transfer values.

The computational mesh 200 can be coarsened in areas that may have less significant changes, for example, by combining computational cells 202 that are not in proximity to a well or other reservoir feature. Similarly, the computational mesh 200 may retain a fine mesh structure in the vicinity of wells or other reservoir features, such as the first well 204, or other reservoir features, for example, a second well 206, a third well 208, a fault 210, or any other features that may show larger changes than other areas.

The computational mesh 200 represents the simulation model, and can be divided among computing units to decrease the amount of time needed to provide a result for the simulation. This procedure may be termed "parallelization." The parallelization of the simulation model is realized by parallelizing the individual components at each time step. To achieve efficient utilization of the parallel computing units the simulation model can be distributed across the computing units so that the computational load is evenly balanced and the amount of inter-unit communication is minimized. This division is performed by partitioning the simulation model, i.e., assigning different computational cells 202 in the computational mesh 200 to different computing units. Each computational cell 202 may require a different approach to parallelization based on the numerical formulation, the actual input data, the computational task, and user supplied options.

In the exemplary embodiment shown in FIG. 2, the computational mesh 200 is partitioned between four computing units, as indicated by the subdomains labeled I-IV. Although four computing units are used in FIG. 2, any number of computing units may be used in other embodiments, depending on the size of the simulation model and the number of near well features. For example, a small simulation model may provide results in a reasonable timeframe from a single computing device, while a large simulation may use 10, 100, 1000, or even more computing units for the parallelization.

Further, while the borders between subdomains I-IV do not cross near well regions or significant reservoir features, the subdomains are not limited to contiguous areas, but may include non-contiguous areas, which may be useful for balancing the load between the computing units. For example, as illustrated in FIG. 2, subdomain I may be divided into two regions. A first region 212 encompasses the near well region for the first well 204, while a second region 214 encompasses a number of larger computational cells 202 that may have less significant changes than the near well regions.

The separation of subdomains between processors allows a lowering of the workload of any one processor, increasing the speed of the simulation. However, information transfers and communications between processors add an overhead cost that may lower the efficiency of the simulation on any one processor. For example, some types of simulation simplifications, such as Krylov iterations, may require the sharing of global information between processing units, adding a substantial overhead cost. Exemplary embodiments of the present techniques provide simulation simplification without sharing information between processors.

Workflow for Modelling a Reservoir

Figure 3:
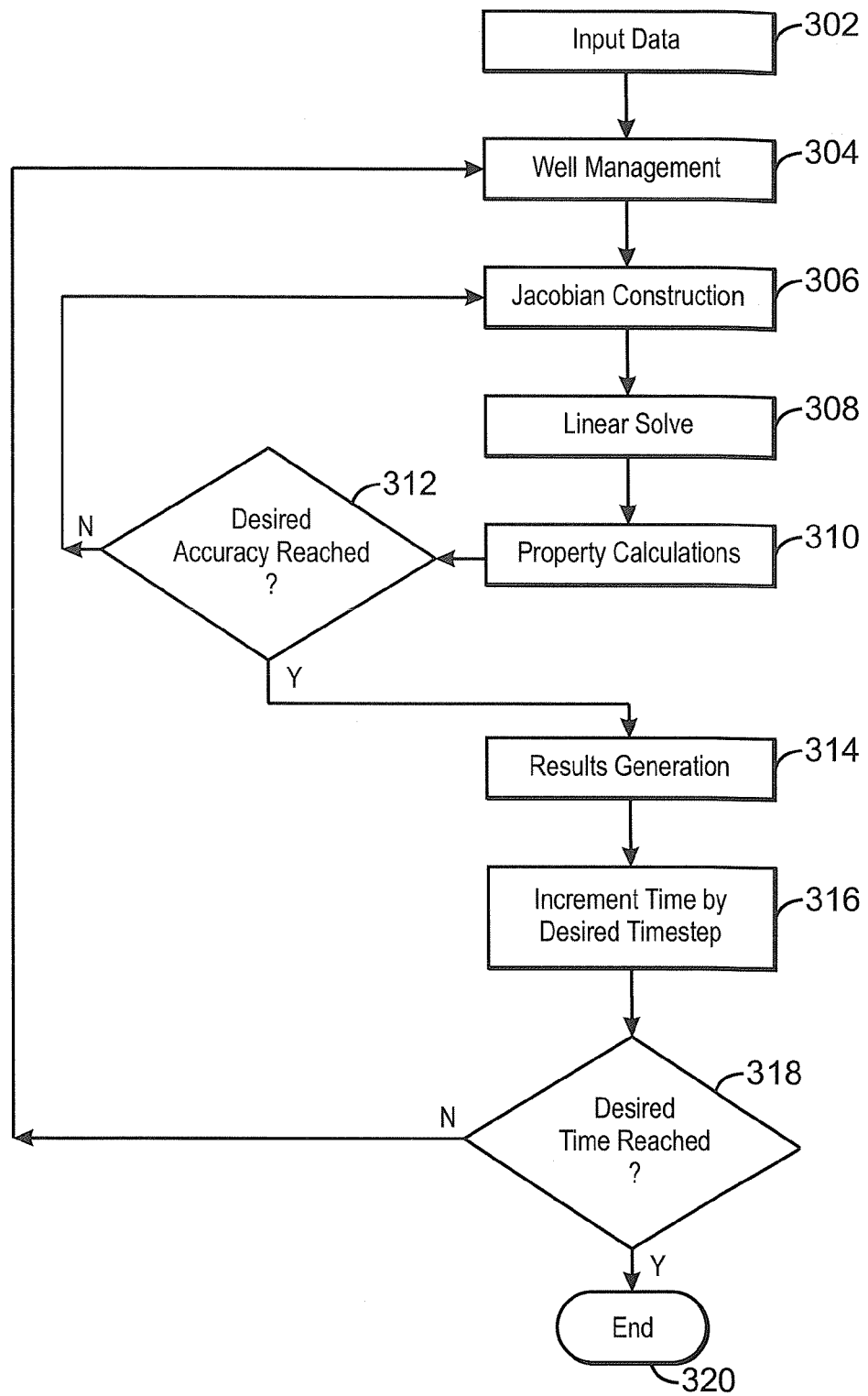
FIG. 3 is a process flow diagram of a workflow for modeling a reservoir.

FIG. 3 is a process flow diagram of a workflow 300 for modelling a reservoir. Although the discretization (coarsening) and the level of implicitness (which state variables, such as pressure or saturation, are treated implicitly or explicitly in the formulation) of the solution process may vary, simulation models generally perform in a similar fashion as workflow 300. A simulation model can begin at block 302 by parsing user input data. The input data may include the problem formulation, a geologic model that is discretized into grid blocks with physical properties defined at each grid block, including rock properties (such as permeability) and fluid properties (such as transmissibility). At block 304, a well management routine computes the current state of surface facilities and wells from the governing equations. At block 306, the values from the well management routine are used along with the value of state variables at each computational cell to construct a Jacobian matrix. The Jacobian matrix is the matrix (or array) of all first order partial derivatives (with respect to the state variables) of a vector valued function. In reservoir simulation, the Jacobian details the change of the governing partial differential equations with respect to the state variables (pressure, saturation).

At block 308, the linear solver uses the Jacobian matrix to generate updates for physical properties of interest, such as pressure and saturation, among others. In embodiments of the present techniques, the matrix may be simplified using the methods described herein prior to solving the matrix to solve for physical properties. At block 310, the calculated physical properties are compared either to previously calculated properties or to measured properties, and, at block 312 a determination is made as to whether a desired accuracy has been reached. In an exemplary embodiment, the determination is made by determining that the calculated properties have not significantly changed since the last iteration (which may indicate convergence). For example, convergence may be indicated if the currently calculated properties are within 0.01%, 0.1%, 1%, 10%, or more of the previously calculated properties. In other embodiments, the determination may be determining if the calculated properties are sufficiently close to measured properties, for example, within 0.01%, 0.1%, 1%, 10%, or more. If the desired accuracy is not reached, process flow returns to block 308 to perform another iteration of the linear solver.

If at block 312, the desired accuracy has been reached, process flow proceeds to block 314, at which results are generated. The results may be stored in a data structure on a non-transitory, computer-readable medium, such as a database, for later presentation, or the results may be immediately displayed or printed after generation. At block 316, the time is incremented by a desired time step, for example, a day, a week, a month, a year, five years, ten years or more, depending, at least in part, on the desired length of time for the simulation. At block 318, the new time is compared to the length desired for the simulation. If the simulation has reached the desired length of time, the simulation ends at block 320. If the time has not reached the desired length, flow returns to block 304 to continue with the next increment.

The parallelization of the processes may be considered to fall into two main types, task based parallelization, and grid based parallelization. For task-based parallelization, a calculation is divided into sub tasks that are run independently in parallel. For example, in the well management task at block 304, a set of operations may be computed on each of a set of wells that can be performed independently of one another. Therefore, each computing unit may execute the operations independently of the other computing units unit.

Grid based parallelization may be performed at a number of points in the processes, such as in the Jacobian construction and/or the property calculations discussed with respect to blocks 306 and 310. In the computational process of constructing the Jacobian, rock and fluid properties with corresponding derivatives are calculated at each computational cell. This type of parallelization is used for computations that do not depend on the computational cells being adjacent or require global communication for the computations.

Vapor-liquid equilibrium (VLE) fluid property computations may be considered in an example of parallelization. If a simulation model uses a black oil fluid characterization for VLE computations, the amount of computational work required for a flash calculation is roughly proportional to the number of computational cells due to the linear nature of the black oil VLE computations. However, if a compositional fluid model is chosen, the amount of computational work for the flash calculation within a single computational cell depends on the cell's position in the phase state space. Hence, the amount of computational work may vary sharply from cell to cell.

Depending on the level of implicitness used on different time steps of the reservoir simulation process, there are two different versions of the solvers that may be used. For an implicit pressure-explicit saturation (IMPES) scheme, only the pressure unknowns may be simultaneously solved. For fully implicit schemes or adaptive implicit schemes, all primary unknowns, including both pressure and saturations, can be implicitly solved. A constrained pressure residual (CPR) method can be used to solve the equations for the unknowns. During each iteration of the CPR method, the pressure unknowns can be solved implicitly and then other unknowns, such as saturations, can be updated using a relaxation technique. A number of relaxation techniques may be used, such as Gauss-Seudel or successive over relaxation (SOR) methods. As most of the relaxation techniques can easily be parallelized, the major task is to create efficient and parallel methods for solving the pressure equation. The techniques may be further explored by examining a computational mesh, as discussed with respect to the following figures.

Figure 4:
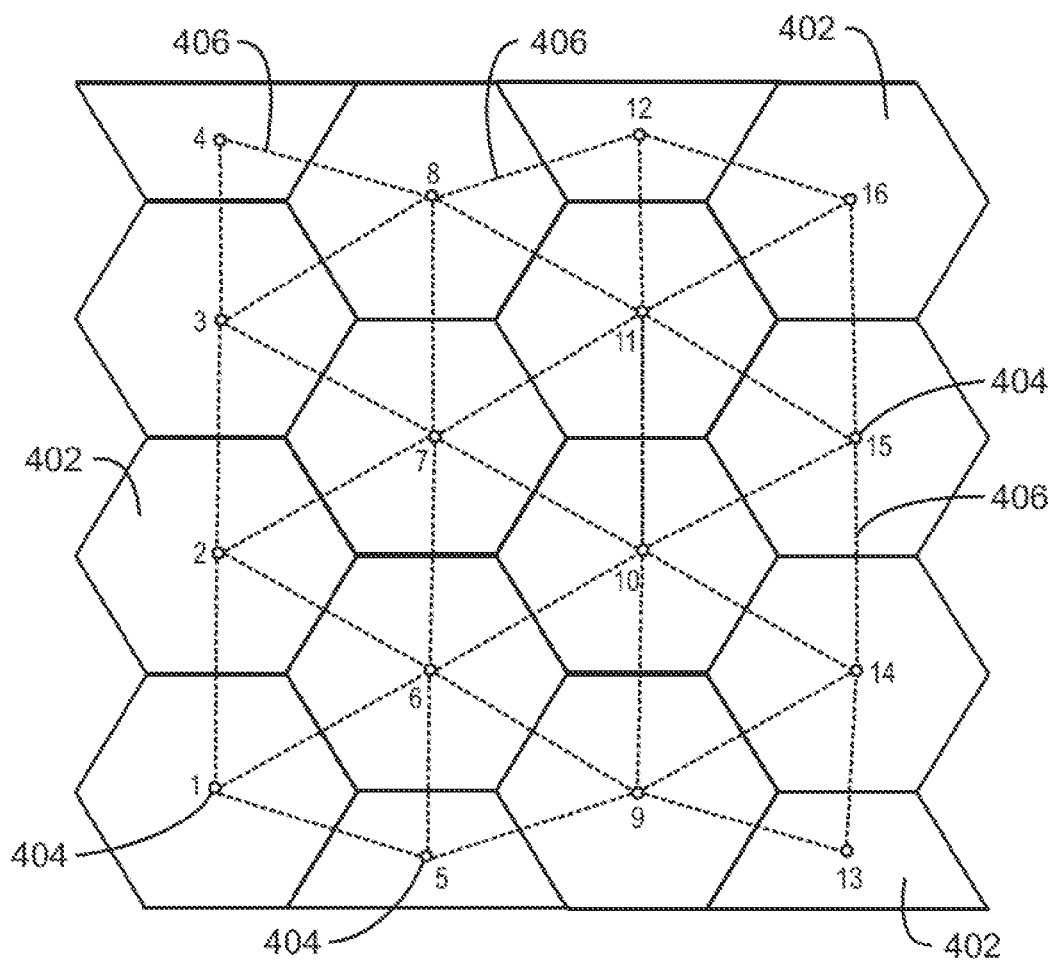
FIG. 4 is an illustration of a computation mesh, showing the interconnections between cells.

FIG. 4 is an illustration of a portion of a computation mesh 400, showing the interconnections between computational cells. In the computational mesh, each of the computational cells 402 is labeled with a number 1-13. The number of cells in the computational mesh (or reservoir model) may be denoted as N. As noted above, the center 404 of each of the computational cells 402 may be associated with various properties, such as saturation, pressure, temperature, and the like. The dotted lines represent an interconnection 406, or links, between two computational cells 402, which may be associated with various flux parameters. For example, the interconnection 406 between cell 8 and cell 7 may be associated with a flow between the computational cells 402, such as from a higher-pressure cell to a lower-pressure cell.

The pressure equation for a reservoir simulation problem can approximated via a finite volume method resulting in the algebraic system shown in Eqn. 1.

$$Ap = f \qquad \text{Eqn. 1}$$

In Eqn. 1, p and f represent vectors of size N, and A is an N×N-matrix such that, for the pressure $p_i$ in the node i, the algebraic equation may be as shown in Eqn. 2.

$$\sum_{j \in Adj(i)} a_{ij}(p_i - p_j) + c_i p_i = f_i \qquad \text{Eqn. 2}$$

In Eqn. 2, Adj(i) represents the set of the computational cells adjacent to the computational cell, and i, $a_{ij}$, and $c_i$ represent nonnegative coefficients. Coefficients $a_{ij}$ represent transmissibility and coefficients $c_i$ represent time derivative which are proportional to the reciprocal of the time step. The term, $f_i$, represents the element of the right-hand-side, which may be called the source term. As an example, in the computational mesh 400, cell 7 will have cells 2, 3, 6, 8, 10, and 11 for neighbors. Accordingly, the set Adj(7) represents the set of those nodes.

A matrix A generated by the finite volume method can be represented be the formula shown in Eqn. 3.

$$A = M + D \qquad \text{Eqn. 3}$$

In Eqn. 3, the matrix M corresponds to the connections between the pressure variables in adjacent computational cells and matrix D is a diagonal matrix. If $N_{ij}$ denotes the assembling N×2-matrix, then matrix M can be represented as shown in Eqn. 4.

$$M = \sum_{i=1}^{N} \sum_{Adj(i)} N_{ij} a_{ij} \begin{pmatrix} 1 & -1 \\ -1 & 1 \end{pmatrix} N_{ij}^T \qquad \text{Eqn. 4}$$

In $N_{ij}$, all elements are zeroes except for the i-th element of the first column and j-th element of the second column, which are equal to 1. It may also be noted that a matrix D can also be represented in a similar form, as shown in Eqn. 5.

$$D = \sum_{i=1}^{N} \sum_{Adj(i)} N_{ij} \begin{pmatrix} d_{ij} & 0 \\ 0 & d_{ji} \end{pmatrix} N_{ij}^T \qquad \text{Eqn. 5}$$

In Eqn. 5, all $d_{ij}$ are nonnegative and $$\sum_{Adj(i)} d_{ij} = c_i.$$

From the definitions provided in Eqns. 3-5, the matrix A can be presented in the assembled form as shown in Eqn. 6.

$$A = \sum_{i=1}^{N} \sum_{Adj(i)} N_{ij} \left[ a_{ij} \begin{pmatrix} 1 & -1 \\ -1 & 1 \end{pmatrix} + \begin{pmatrix} d_{ij} & 0 \\ 0 & d_{ji} \end{pmatrix} \right] N_{ij}^T \qquad \text{Eqn. 6}$$

An example of such matrix corresponding to the grid from FIG. 4 is shown in FIG. 5.

FIG. 5 is a Jacobian matrix 500, generated from the computational mesh shown in FIG. 4, in which the off-diagonal elements correspond to interconnections between computational cells. For each local matrix, for example, as shown with respect to Eqn. 7, a local preconditioning matrix may be defined, as shown in Eqn. 8. As used herein, a local matrix is the matrix corresponding to a single interconnection.

$$A_{ij} = a_{ij} \begin{pmatrix} 1 & -1 \\ -1 & 1 \end{pmatrix} + \begin{pmatrix} d_{ij} & 0 \\ 0 & d_{ji} \end{pmatrix} \qquad \text{Eqn. 7}$$

$$B_{ij} = \beta \cdot a_{ij} \begin{pmatrix} 1 & -1 \\ -1 & 1 \end{pmatrix} + \begin{pmatrix} d_{ij} & 0 \\ 0 & d_{ji} \end{pmatrix} \qquad \text{Eqn. 8}$$

Further, it can be shown that for any two-dimensional vector x the inequalities presented in Eqns. 9 and 10 hold true.

$$(B_{ij}x, x) \le (A_{ij}x, x) \le \left(1 + \frac{d_{ij} + d_{ji}}{d_{ij} d_{ji}} a_{ij}\right)(B_{ij}x, x), \qquad \text{Eqn. 9}$$

if $\beta = 0$ $$(B_{ij}x, x) \le (A_{ij}x, x) \le \frac{1}{\beta}(B_{ij}x, x), \qquad \text{Eqn. 10}$$

if $\beta \ne 0$

The first condition ($\beta=0$), shown in Eqn. 9, corresponds to a "dropped link." The second condition ($\beta\neq0$), shown in Eqn. 10, corresponds to a "scaled link." Accordingly, for the matrix A defined by Eqn. 6, a preconditioning matrix may be defined as shown in Eqn. 11.

$$B = \sum_{i=1}^{N} \sum_{Adj(i)} N_{ij} \left[ \beta_{ij} a_{ij} \begin{pmatrix} 1 & -1 \\ -1 & 1 \end{pmatrix} + \begin{pmatrix} d_{ij} & 0 \\ 0 & d_{ji} \end{pmatrix} \right] N_{ij}^T \quad \text{Eqn. 11}$$

Figure 12:
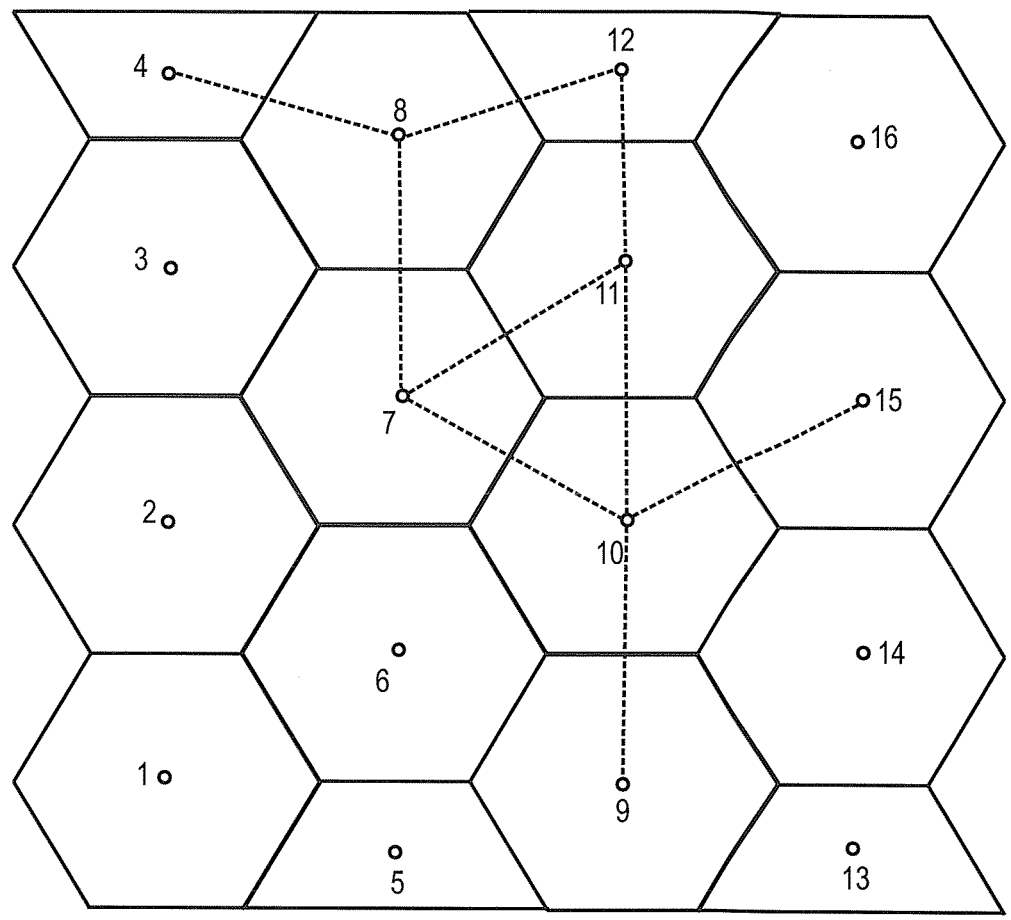
FIG. 12 is a drawing of a computational mesh showing only the scaled links between cells that may result after performing a coarsening algorithm on the computational mesh of FIG. 8, i.e., the links shown in FIG. 8 but missing in FIG. 12 are dropped links.

Using the inequalities for local matrices shown in FIG. 12, it can be proven that for any N-dimensional vector u that the inequalities shown in Eqn. 13 always hold true.

$$(B_{ij}x,x) \leq (A_{ij}x,x) \leq \gamma_{ij}(B_{ij}x,x) \quad \text{Eqn. 12}$$

$$(Bu,u) \leq (Au,u) \leq \gamma(Bu,u) \quad \text{Eqn. 13}$$

In Eqns. 12 and 13, it may be assumed that $$\gamma = \max_{ij} \gamma_{ij},$$

indicating that matrices A and B are spectrally equivalent. The usual notation to indicate spectral equivalence is shown in Eqn. 14.

$$B \leq A \leq \gamma B \quad \text{Eqn. 14}$$

Figure 6:
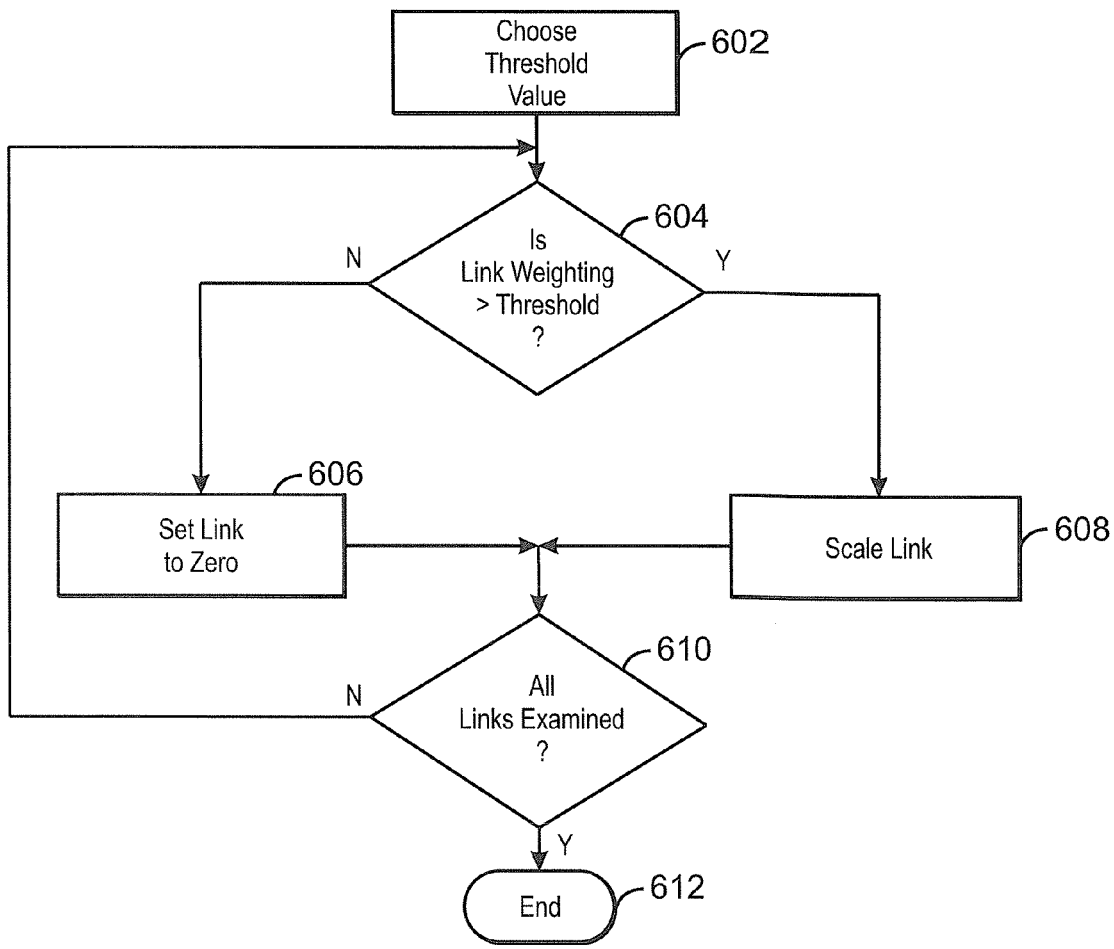
FIG. 6 is a process flow diagram presenting a method for implementing a coarsening algorithm, in accordance with an exemplary embodiment of the present technique.

The formulas discussed above may be used to generate a coarsening algorithm, as discussed with respect to FIG. 6.

Coarsening Algorithm

FIG. 6 is a process flow diagram presenting a method 600 for implementing a coarsening algorithm. The method 600 begins at block 602, with the choice of a threshold. The threshold, represented by σ, can be any real number greater than 1. For example, one method that may be used to select a threshold is discussed with respect to FIG. 7. At block 604, for any interconnection ij between adjacent cells, i and j, the interconnection weighting is compared to the threshold. The interconnection weighting and comparison may be performed using the formula $$\left( 1 + \frac{d_{ij} + d_{ji}}{d_{ij} d_{ji}} a_{ij} \right) \leq \sigma,$$

wherein $d_{ij}$ and $d_{ji}$ represent the diagonal elements of the computational cells i and j in the matrix. If the interconnection weighting is equal to or less than the threshold, the interconnection is set to zero, i.e., $\beta_{ij}=0$, as indicated at block 606. In this case, each of the corresponding off-diagonal elements in the matrix is set to zero as well. If the interconnection weighting is greater than the threshold, at block 608 the interconnection may be scaled, for example, $\beta_{ij}=1/\sigma$.

At block 610, a determination is made as to whether all interconnections have been examined. If not, process flow returns to block 604 to examine the next interconnection. If so, process flow ends at block 612. Once the method 600 is completed, the relationship between Matrices A and B may be as shown in Eqn. 15.

$$B \leq A \leq \sigma B \quad \text{Eqn. 15}$$

It should be noted that the value of the threshold, σ, controls the sparsity of matrix B. The larger the threshold, the sparser the matrix B becomes. Depending on the value chosen for the threshold, σ, some of the rows of matrix B may not have any non-zero off-diagonal elements. This indicates that all interconnections, or links, to neighboring computational cells from the computational cells 402 (FIG. 4) that correspond to those rows have been dropped. One method for selecting of the value of the threshold is discussed with respect to FIG. 7.

Figure 7:
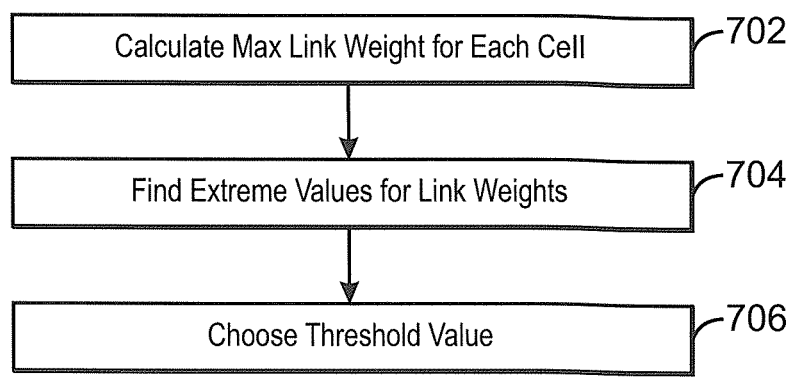
FIG. 7 is a process flow diagram illustrating a method for selecting a value for the threshold, $\sigma$.

FIG. 7 is a process flow diagram illustrating a method 700 for selecting a value for the threshold, σ. It should be noted that this is not the only method 700 that may be used, as any number of other methods, including experience, may be used to select appropriate threshold values. The method 700 begins at block 702 by calculating a value, $b_i$, for each cell 402 (FIG. 4). The term, $b_i$, represents the largest interconnection to another cell for a particular cell 402 in the computational mesh 400. For all cells i=1, . . . , N find values $b_i$ according to Eqn. 16.

$$b_i = \max_{j \in Adj(i)} \left( 1 + \frac{d_{ij} + d_{ji}}{d_{ij} d_{ji}} a_{ij} \right) \quad \text{Eqn. 16}$$

At block 704, the extreme values of $b_i$, e.g., $b_{min} = \min_{i} b_i$ and $b_{max} = \max_{i} b_i$, are identified.

At block 706, σ is chosen so that $b_{min} \leq \sigma \leq b_{max}$. For example, σ may be chosen using the formula shown in Eqn. 17.

$$\sigma = \frac{1}{2}(b_{min} + b_{max}) \quad \text{Eqn. 17}$$

Once the threshold function has selected, it may be imposed on the matrix to increase the sparsity of the matrix, for example, by dropping weaker connections between cells 402, decreasing the number of connections between cells 402.

Figure 8:
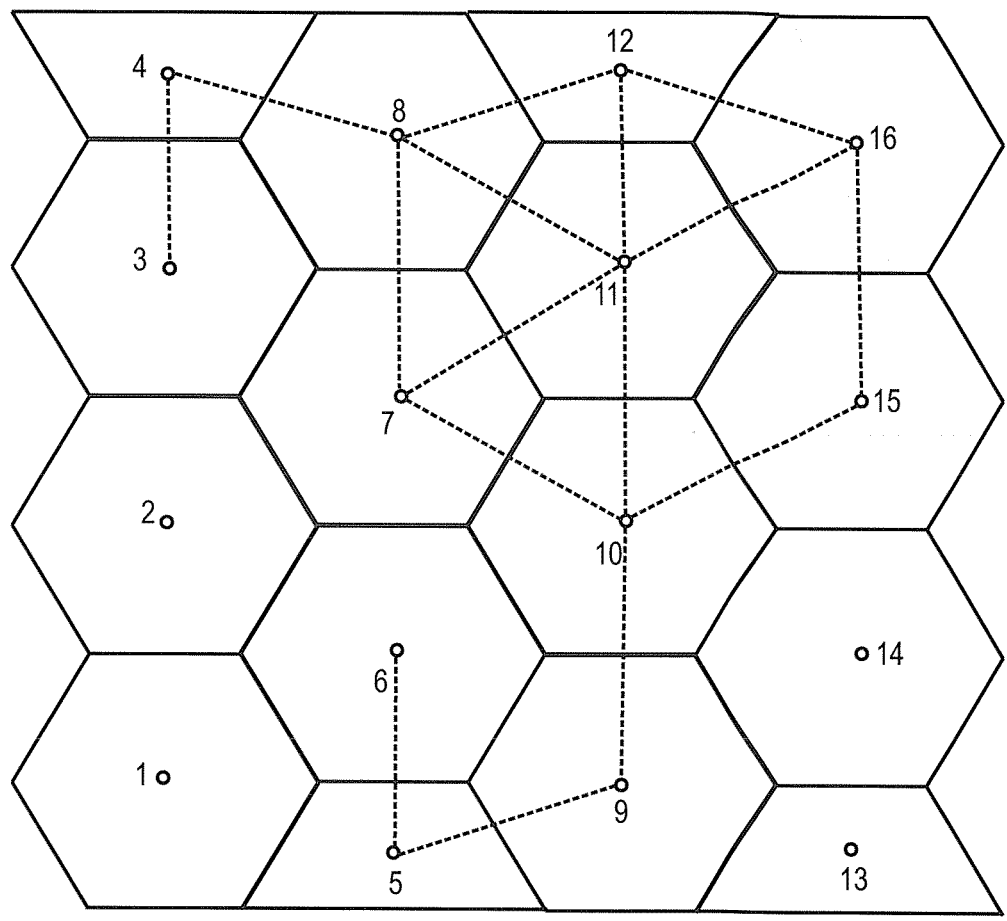
FIG. 8 is a drawing of a computational mesh showing only the scaled links between cells that may result after performing a coarsening algorithm on the computational mesh 400 of FIG. 4.

FIG. 8 is a drawing of a computational mesh 800 showing only the scaled links between cells with other links being dropped that may result after performing a coarsening algorithm on the computational mesh 400 of FIG. 4. The corresponding example of a matrix $B_0$ constructed by the coarsening algorithm is shown in FIG. 9.

FIG. 9 shows a matrix 900, referred to herein as matrix $B_0$, constructed from the computational mesh 800 of FIG. 8. The cells of the computational domain can be partitioned into two groups in accordance with the sparsity structure of matrix $B_0$. This is discussed in further detail with respect to FIG. 10.

FIG. 10 shows a matrix 1000, which is a sorted version of the matrix $B_0$ from FIG. 9. Two groups of cells are apparent. A first group of cells 1002 includes all of the cells that have connections with other cells. These cells correspond to those rows of the matrix $B_0$ that have nonzero off-diagonal elements. A second group of cells 1004 has all of the cells with all connections between cells dropped. These cells correspond to those rows of matrix $B_0$ that do not have off-diagonal elements. Thus, after the partition of the cells into the groups 1002 and 1004, the matrix $B_0$ can be represented in a 2×2-block form, as shown in Eqn. 18.

$$B = \begin{bmatrix} B_{11} & \\ & B_{22} \end{bmatrix} \qquad \text{Eqn. 18}$$

In Eqn. 18, the block $B_{22}$ is a diagonal matrix. After generating the partition shown in Eqn. 18, matrix $B_{11}$ 1002 from FIG. 10 may be defined as a new coarse grid matrix $A_1 = B_{11}$, as shown in FIG. 11.

FIG. 11 is a new coarse grid matrix 1100, which is a new coarse grid matrix $A_1 = B_{11}$ of FIG. 10, in which $B_{22}$ has been dropped. It can be noted that the matrix $A_I$ has the same properties as the original matrix. In other words, it may be represented in the form shown in Eqn. 6, and the same procedure for constructing a preconditioner $B_1$, described above, can be applied to $A_I$. Thus, it is possible to apply the preconditioner (coarsening procedure) recursively. Accordingly, for any given integer $t > 0$ it is possible to construct a sequence of matrices as shown in Eqn. 19.

$$A \equiv A_0 \to B_0 \to A_1 \to B_1 \to \ldots \to B_{t+1} \to A_t \to B_t \qquad \text{Eqn. 19}$$

The sequence of matrices satisfies a number of properties. First, each coarsened matrix, $B_k$, $k=1, \ldots, t-1$, can be represented in the 2×2 block form shown in Eqn. 20.

$$B_k = \begin{bmatrix} B_{k,11} & \\ & B_{k,22} \end{bmatrix} \qquad \text{Eqn. 20}$$

Further, each $B_{k,11}$ can be defined as the new matrix $A_{k+1}$. Further, for each $k=1, \ldots, t$, the positive constants $\alpha_k$ and $\beta_k$ are known such that $0 < \alpha_k \le \beta_k$ and the condition in Eqn. 21 is satisfied.

$$\alpha_k B_k \le A_k \le \beta_k B_k \qquad \text{Eqn. 21}$$

An example of the application of the coarsening algorithm above may be shown in FIGS. 8-19. As discussed above, FIG. 8 shows only scaled links between the cells, which may be used to construct the matrix $B_0$, shown in FIGS. 9 and 10. FIG. 10 shows the reordered matrix $B_0$ in accordance with Eqn. 18. FIG. 11 shows the matrix $A_1$ obtained from matrix $B_0$.

FIG. 12 is a drawing of a computational mesh 1200 showing only the scaled links between cells with all other links being dropped that may result after performing a second iteration of a coarsening algorithm on the computational mesh 800 of FIG. 8. The result may be used to construct matrix $B_1$ shown in FIG. 13.

FIG. 13 is the matrix $B_1$ 1300 created from computational mesh of FIG. 12. The matrix $B_1$ may be reordered using Eqn. 18, as discussed with respect to FIG. 14.

FIG. 14 shows the reordered matrix $B_1$ 1400 created from the matrix of FIG. 13. As discussed above, the cells that do not interact with other cells, e.g., that have no non-zero off-diagonal elements, may be dropped and a new matrix $A_2$ may be defined from the resulting matrix.

FIG. 15 shows an example 1500 of matrix $A_2$ obtained from matrix $B_1$ after the diagonal matrix $B_{22}$ has been dropped. As mentioned above, the coarsening procedure may be iterated a number of times to further simplify the calculations.

Figure 16:
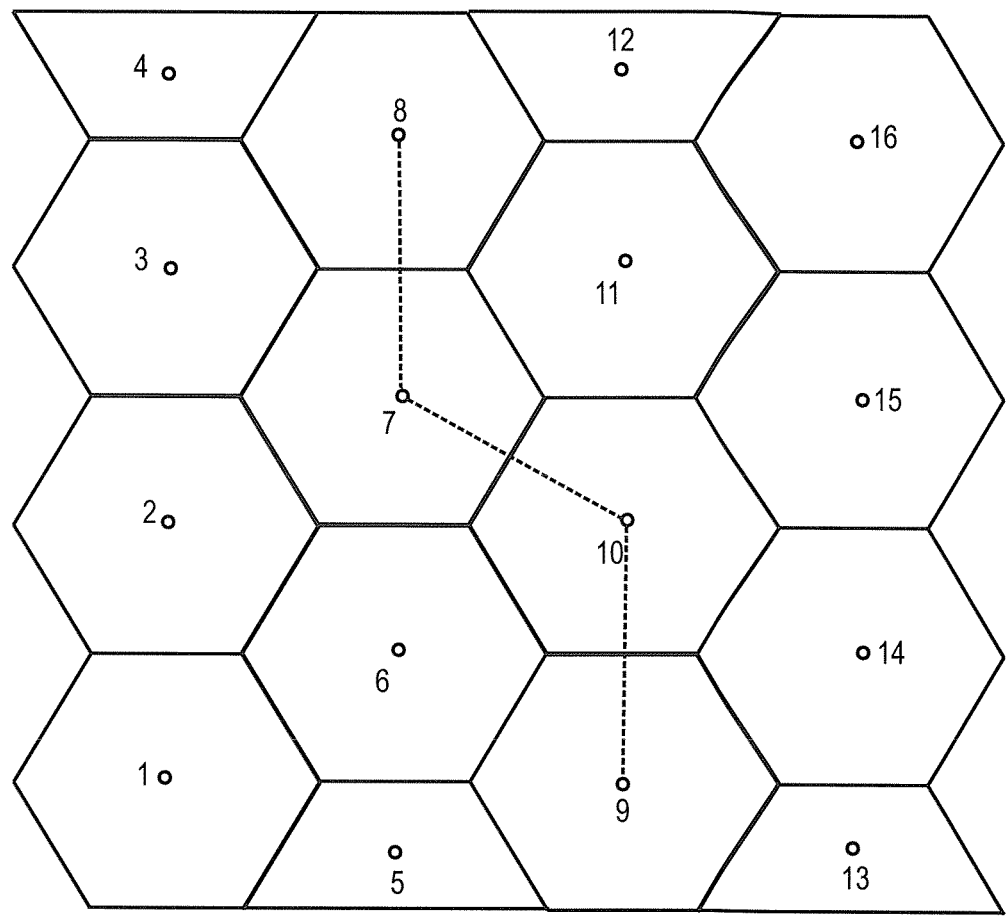
FIG. 16 is a drawing of a computational mesh showing only the scaled links between cells that may result after performing a coarsening algorithm on the computational mesh of FIG. 12.

FIG. 16 is a drawing of a computational mesh 1600 showing only the scaled links between cells with all other links being dropped that may result after performing another iteration of a coarsening algorithm on the computational mesh 1200 of FIG. 12. This computational mesh may be used to construct the matrix $B_2$.

Figures 17, 18:
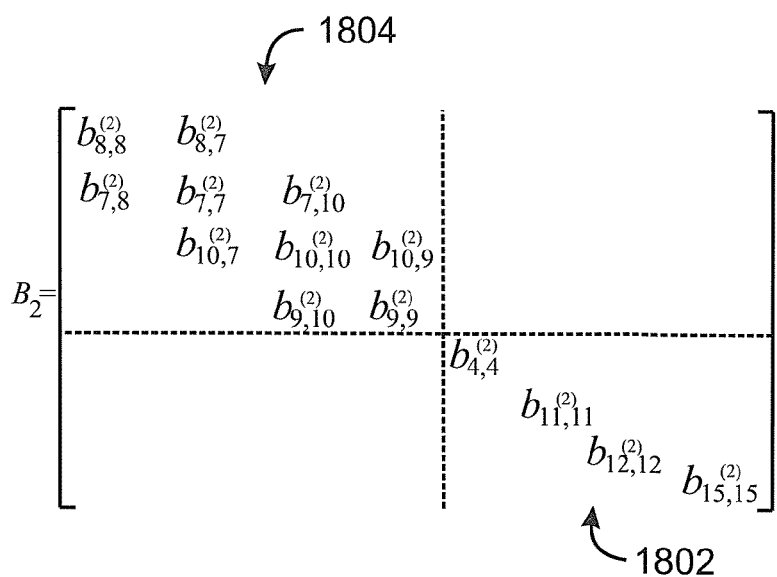
FIG. 17 is the matrix $B_2$ created from computational mesh of FIG. 16.
FIG. 18 shows the reordered matrix $B_2$.

FIG. 17 is the matrix $B_2$ 1700 created from computational mesh of FIG. 16. As described above, the matrix $B_2$ may also be reordered using Eqn. 18.

FIG. 18 shows the reordered matrix $B_2$ 1800. As described above, the portion of the matrix $B_{22}$ 1802 that represents cells that are not connected to other cells may be dropped. The remaining portion 1804 may be used to create another starting matrix $A_3$.

FIG. 19 shows an example of matrix $A_3$ 1900 obtained from matrix $B_2$ after dropping the diagonal elements $B_{22}$. The comparison between this matrix $A_3$ and that shown for $A_I$ in FIG. 5 illustrates the simplification that may be obtained using the coarsening algorithm. Using the sequence of matrices as illustrated in Eqn. 19 it is possible to construct the preconditioner $\hat{B}$ as shown in FIG. 20.

Restricting the Solution to a Coarser Grid to Create the Preconditioner

Figure 20:
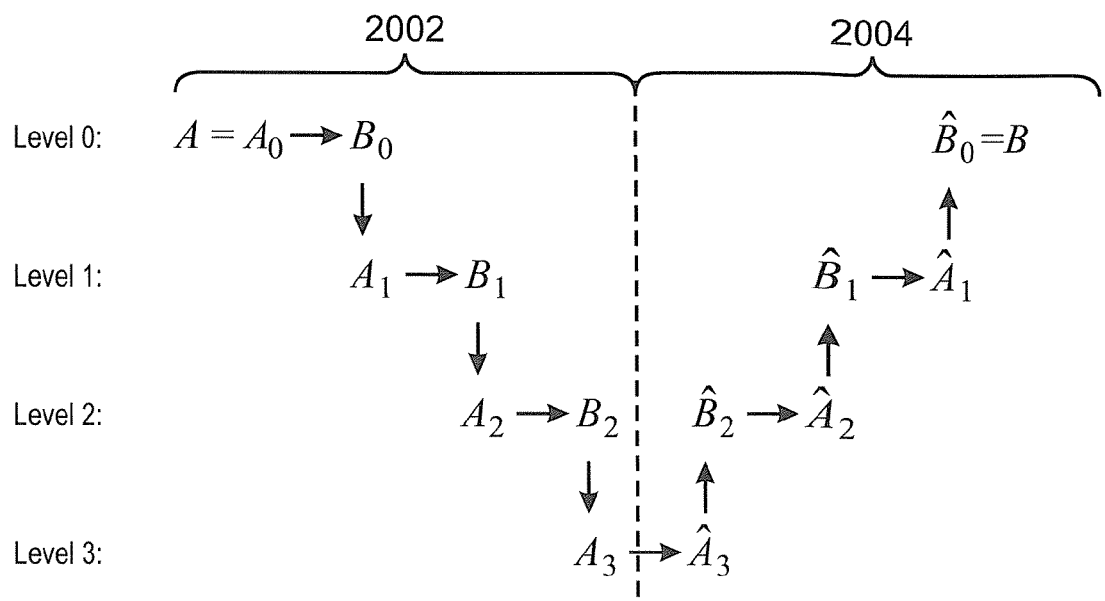
FIG. 20 is an illustration of the creation of a preconditioner.

FIG. 20 is an illustration 2000 of the creation of a preconditioner. As shown in FIG. 20, the coarsening procedure may be iteratively performed as indicated by reference number 2002. Once the coarsening procedure is finished, the solution may be iteratively restricted to a coarser grid, as indicated by reference number 2004.

Figure 21:
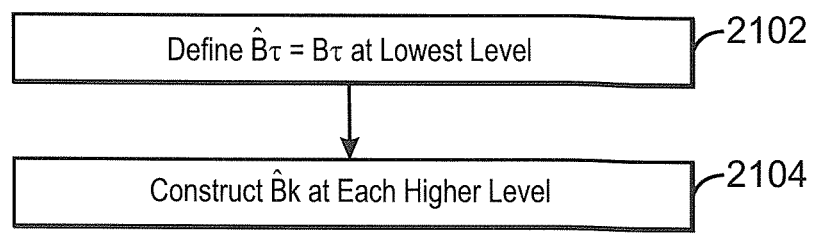
FIG. 21 is a process flow diagram of a method for constructing the preconditioner on a sequence of grids.

FIG. 21 is a process flow diagram of a method 2100 for constructing the preconditioner on a sequence of grids. The method 2100 starts at block 2102 at the coarsest level $k=t$ (for example, level 3 in FIG. 20) and defines $\hat{B}_t = B_t$. From Eqn. 21, the relationship in Eqn. 22 may be derived.

$$a_t \hat{B}_t \le A_t \le b_t \hat{B}_t \qquad \text{Eqn. 22}$$

In Eqn. 22, $a_t = \alpha_t$ and $b_t = \beta_t$. At block 2104, the matrix $\hat{B}_k$ is constructed for each level $k = t-1, \ldots, 0$. This is performed by choosing an integer $s_k > 0$, and constructing the matrix $\hat{B}_k$ as shown in Eqn. 23.

$$\hat{B}_k = \begin{bmatrix} \hat{A}_{k+1} & \\ & B_{k,22} \end{bmatrix} \qquad \text{Eqn. 23}$$

In Eqn. 23, the term $\hat{A}_{k+1}$ can be calculated using the formula shown in Eqn. 24.

$$\hat{A}_{k+1} = \left( \left[ I - \prod_{j=1}^{s_k} \left( I - \tau_{k+1,j} \hat{B}_{k+1}^{-1} A_{k+1} \right) \right] A_{k+1}^{-1} \right)^{-1} \qquad \text{Eqn. 24}$$

The parameters $\tau_{k+1,j}$, $j=1, \ldots, s_k$, are chosen in such a way that the polynomial shown in Eqn. 25 is the least deviating from zero polynomial on the segment $[a_{k+1}, b_{k+1}]$.

$$p_{k+1}(z) = \prod_{j=1}^{s_k} (1 - \tau_{k+1,j} z) \qquad \text{Eqn. 25}$$

The polynomial with such property is given in terms of Chebyshev polynomials.

The matrix $\hat{B} = \hat{B}_0$ constructed using Eqns. 22, 23, and 24 is defined to be a multilevel preconditioner for matrix A. It can be noted that for given vector u the vector $v = \hat{A}_{k+1}^{-1} u$ can be computed by the iterative procedure shown in Eqn. 26.

$$v_0 = 0$$

$$v_j = v_{j-1} - \tau_{k+1,j} \hat{B}_{k+1}^{-1}(A_{k+1}v_{j-1} - u),$$

$$j = 1, \ldots, s_k$$

$$v = v_{s_k}$$

Eqn. 26

The theory of Chebyshev methods implies (see Eqn. 22) that the eigenvalues of the matrix $\hat{A}_{k+1}^{-1}A_{k+1}$ belong to the segment shown in Eqn. 27.

$$\left[\frac{(1-q_{k+1}^{s_k})^2}{1+q_{k+1}^{2s_k}}, \frac{(1+q_{k+1}^{s_k})^2}{1+q_{k+1}^{2s_k}}\right]$$

Eqn. 27

In Eqn. 27, $q_{k+1} = (\sqrt{b_{k+1}/a_{k+1}} - 1)/(\sqrt{b_{k+1}/a_{k+1}} + 1)$. It can then be shown that the eigenvalues of the matrix $\hat{B}_{k+1}^{-1,A}{}_{k+1}$ belong to the segment shown in Eqn. 28.

$$[a_k, b_k] \equiv \left[\frac{(1-q_{k+1}^{s_k})^2}{1+q_{k+1}^{2s_k}}\alpha_k, \frac{(1+q_{k+1}^{s_k})^2}{1+q_{k+1}^{2s_k}}\beta_k\right]$$

Eqn. 28

FIG. 20 shows the workflow of application of the generation of the preconditioner for the sequence of grids shown in FIGS. 4, 8, 12, 16, and the matrices $A_k$ and $B_k$, shown in FIGS. 5, 10, 11, 14, 15, 17, and 19.

It can be noted that the goal of classical geometrical or algebraic multigrid methods is to quickly reduce the dimension of the matrix. The construction of the proposed preconditioner, discussed herein, differs from this approach in that the reduction of the matrix dimension is not as important as the reduction of the number of nonzero elements of the matrix. The present method depends on Chebyshev iterations between the levels. Therefore, the main computational cost of solving the system of linear equations with the proposed preconditioner is in multiplication of the level matrices by vectors. This cost is linear with respect to the number of non-zero entries in the matrices $A_k$.

Exemplary Cluster Computing System

Figure 22:
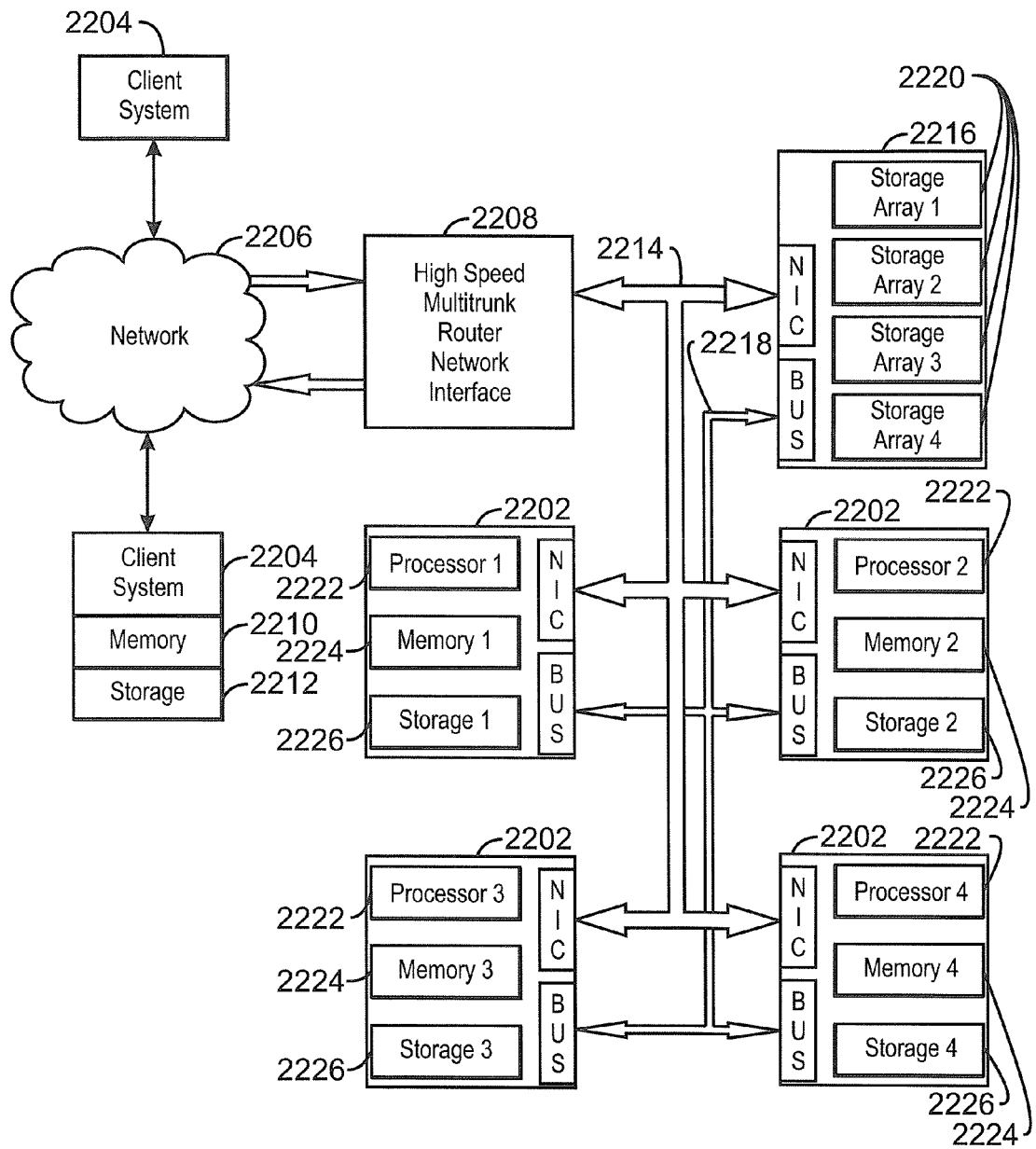
FIG. 22 is a block diagram of an exemplary cluster computing system that may be used in exemplary embodiments of the present techniques.

FIG. 22 is a block diagram of a cluster computing system 2200 that may be used in exemplary embodiments of the present techniques. The cluster computing system 2200 illustrated has four computing units 2202, each of which may perform calculations for part of the simulation model. However, one of ordinary skill in the art will recognize that the present techniques are not limited to this configuration, as any number of computing configurations may be selected. For example, a small simulation model may be run on a single computing unit 2202, such as a workstation, while a large simulation model may be run on a cluster computing system 2200 having 10, 100, 1000, or even more computing units 2202. In an exemplary embodiment, each of the computing units 2202 will run the simulation for a single subdomain. However, allocation of the computing units 2202 may be performed in any number of ways. For example, multiple subdomains may be allocated to a single computing unit 2202 or multiple computing units 2202 may be assigned to a single subdomain, depending on the computational load on each computing unit 2202.

The present techniques do not involve computation of inner products during Chebyshev iterations. Accordingly, when implemented on a parallel computing architecture, the present techniques do not involve global communications and do not require any barriers, e.g., synchronization points in the computational workflow when a computing unit (processor) must stop and cannot proceed until all other computing units (processors) reach this barrier. The only communications between the processing units are neighbor-to-neighbor communications for matrix multiplication. Thus, the method has better scalability property then classical Krylov-type iterative methods used in reservoir simulations (like GMRES, BiCGStab, and the like). However, the present techniques may also be used within a framework of classical Krylov-type iterative methods like GMRES, BiCGStab, and the like.

The cluster computing system 2200 may be accessed from one or more client systems 2204 over a network 2206, for example, through a high-speed network interface 2208. The network 2206 may be a local area network (LAN), a wide area network (WAN), or the Internet. Each of the client systems 2204 may have tangible, computer readable memory 2210 for the storage of operating code and programs, including random access memory (RAM) and read only memory (ROM). The operating code and programs may include the code used to implement all or portions of the techniques described herein, for example, the methods discussed with respect to FIGS. 6, 7, and 21. The client systems 2204 can also have other tangible, computer readable media, such as storage systems 2212. The storage systems 2212 may include one or more hard drives, one or more optical drives, one or more flash drives, any combinations of these units, or any other suitable storage device. The storage systems 2212 may be used for the storage of code, models, data, and other information used for implementing the methods described herein.

The high-speed network interface 2208 may be coupled to one or more communications busses in the cluster computing system 2200, such as a communications bus 2214. The communication bus 2214 may be used to communicate instructions and data from the high-speed network interface 2208 to a cluster storage system 2216 and to each of the computing units 2202 in the cluster computing system 2200. The communications bus 2214 may also be used for communications among computing units 2202 and the storage array 2216. In addition to the communications bus 2214, a high-speed bus 2218 can be present to increase the communications rate between the computing units 2202 and/or the cluster storage system 2216.

The cluster storage system 2216 can have one or more tangible, computer readable media devices, such as storage arrays 2220 for the storage of data, visual representations, results, code, or other information, for example, to implement all or portions of the techniques described herein, such as the methods discussed with respect to FIGS. 6, 7, and 21. The storage arrays 2220 may include any combinations of hard drives, optical drives, flash drives, holographic storage arrays, or any other suitable devices.

Each of the computing units 2202 can have a processor 2222 and associated non-transitory, computer readable media, such as memory 2224 and storage 2226. The memory 2224 may include ROM and/or RAM used to store code, for example, used to direct the processor 2222, for example, to implement all or portions of the techniques described herein, such as the methods discussed with respect to FIGS. 6, 7, and 21. The storage 2226 may include one or more hard drives, one or more optical drives, one or more flash drives, or any combinations thereof. The storage 2226 may be used to provide storage for intermediate results, data, images, or code associated with operations, including code used to implement all or portions of the techniques described herein, such as the methods discussed with respect to FIGS. 6, 7, and 21.

The present techniques are not limited to the architecture of the cluster computer system 2200 illustrated in FIG. 22. For example, any suitable processor-based device may be utilized for implementing all or any portion of embodiments of the present techniques, including without limitation personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A method of performing a parallel reservoir simulation, comprising:

generating a distributed data representation in a computer storage system, wherein the data representation comprises at least one interconnection weight that represents the magnitude of an interconnection between each of a plurality of computational cells in a computational mesh, and wherein the data representation comprises a Jacobian matrix;

on a first processor, determining a first threshold value, wherein determining the first threshold value comprises:

calculating a maximum interconnection weight for interconnections of each of a first portion of the plurality of computational cells to all adjoining computational cells;

identifying the largest value of the maximum interconnection weight for all of the first portion of the plurality of computational cells;

identifying the smallest value of the maximum interconnection weights for all of the first portion of the plurality of computational cells; and selecting the first threshold value to lie between the largest value and the smallest value, on a second processor, determining a second threshold value, wherein determining the second threshold value comprises:

calculating a maximum interconnection weight for interconnections of each of a second portion of the plurality of computational cells to all adjoining computational cells;

identifying the largest value of the maximum interconnection weight for all of the second portion of the plurality of computational cells;

identifying the smallest value of the maximum interconnection weights for all of the second portion of the plurality of computational cells; and selecting the second threshold value to lie between the largest value and the smallest value, selecting a final threshold value based at least in part on the first threshold value and the second threshold value;

comparing the final threshold value to each interconnection weight wherein comparing the final threshold value to each interconnection weight comprises using the formula $$\left(1 + \frac{d_{ij} + d_{ji}}{d_{ij} d_{ji}} a_{ij}\right) \leq \sigma,$$

wherein $d_{ij}$ and $d_{ji}$ represent the diagonal elements of the computational cells i and j in the Jacobian matrix, wherein $\sigma$ represents the final threshold value, and wherein $a_{ij}$ represents transmissibility, and wherein comparing the final threshold value to each interconnection weight does not involve global communications for this iteration or any subsequent iteration; and setting any interconnection weight that is equal to or less than the final threshold value to zero.

2. The method of claim 1, wherein the first threshold value is an average of the largest value and the smallest value of the maximum interconnection weight for all of the first portion of the plurality of computational cells, wherein the second threshold value is an average of the largest value and the smallest value of the maximum interconnection weight for all of the second portion of the plurality of computational cells, or both.

3. The method of claim 1, further comprising generating a lower level computational mesh in the storage system by eliminating any one of the plurality of computational cells from the computational mesh that has no interconnections to other computational cells.

4. The method of claim 3, further comprising generating a sequence of lower level computational meshes in the storage system by iteratively:

generating a third threshold value for an iteratively lower level computational mesh to lie between the largest value and the smallest value;

comparing the third threshold value to each interconnection weight and setting any interconnection weight that is equal to or less than the third threshold value to zero; and eliminating any computational cell from the computational mesh that has no interconnections to other computational cells to create a next lower level computational mesh.

5. The method of claim 4, further comprising:

generating a preconditioner that restricts a solution to a lowest level computational mesh; and, iteratively, generating a preconditioner that restricts the solution to a next higher computational mesh until a highest level computational mesh is reached.

6. The method of claim 5, comprising using a preconditioner in a Krylov-type iterative method to perform a reservoir simulation.

7. The method of claim 6, wherein the Krylov-type iterative method comprises gradient minimal residual (GMRES) or biconjugate gradient stabilized (BiCGStab).

8. A method for managing hydrocarbon production from a reservoir, comprising:

using a parallel reservoir simulation comprising:

generating a distributed data representation in a computer storage system, wherein the data representation comprises at least one interconnection weight that represents the magnitude of an interconnection between each of a plurality of computational cells in a computational mesh;

on a first processor, determining a first threshold value, wherein determining the first threshold value comprises:

calculating a maximum interconnection weight for interconnections of each of a first portion of the plurality of computational cells to all adjoining computational cells;
identifying the largest value of the maximum interconnection weight for all of the first portion of the plurality of computational cells;
identifying the smallest value of the maximum interconnection weights for all of the first portion of the plurality of computational cells; and
selecting the first threshold value to lie between the largest value and the smallest value, on a second processor, determining a second threshold value, wherein determining the second threshold value comprises:
calculating a maximum interconnection weight for interconnections of each of a second portion of the plurality of computational cells to all adjoining computational cells;
identifying the largest value of the maximum interconnection weight for all of the second portion of the plurality of computational cells;
identifying the smallest value of the maximum interconnection weights for all of the second portion of the plurality of computational cells; and
selecting the second threshold value to lie between the largest value and the smallest value, selecting a final threshold value based at least in part on the first threshold value and the second threshold value;
comparing the final threshold value to each interconnection weight, wherein comparing the final threshold value to each interconnection weight does not involve global communications for this iteration or any subsequent iteration; and
setting any interconnection weight that is equal to or less than the final threshold value to zero, wherein the data representation comprises a Jacobian matrix in which each diagonal element represents one of the plurality of computational cells in the computational mesh, and the method further comprises:
generating the interconnection weights between each of the plurality of computational cells from off-diagonal elements in the Jacobian matrix;
comparing the final threshold value to each interconnection weight, and, for each of the plurality of computational cells that have an interconnection weight equal to or less than the final threshold value, setting the off-diagonal elements to zero; and
eliminating any rows in the Jacobian matrix that have no remaining off-diagonal elements to generate a lower level Jacobian matrix; and
identifying new locations for production wells or injection wells based, at least in part, upon a result from the reservoir simulation; or
determining whether to convert a production well into an injection well, convert an injection well into a production well, or any combinations thereof, based, at least in part, on a result from the reservoir simulation.

9. The method of claim 4, further comprising:
iterating to create one or more additional lower level of matrices, by:
determining a third threshold value to lie between the largest value and the smallest value;
generating one or more second interconnection weights from the off-diagonal elements for each computational cell in the lower level Jacobian matrix;
comparing the third threshold value to each second interconnection weight, and, for each computational cell in the lower level Jacobian matrix that has an interconnection weight equal to or less than the third threshold value, setting the off-diagonal elements to zero; and
eliminating any rows in the lower level Jacobian matrix that have no remaining off-diagonal elements to generate a second lower level Jacobian matrix.

10. The method of claim 9, further comprising constructing a preconditioner by restricting the solution to the second lower level Jacobian matrix.

11. The method of claim 9, wherein the second lower level Jacobian matrix is a lowest level Jacobian matrix, wherein the Jacobian matrix is a highest level Jacobian matrix, and wherein the lower level Jacobian matrix is between the lowest level Jacobian matrix and the highest level Jacobian matrix, comprising, starting from a lowest level Jacobian matrix and proceeding to a highest level Jacobian matrix, constructing a preconditioner by iteratively restricting the solution to each higher level Jacobian matrix.

12. A method for managing hydrocarbon production from a reservoir, comprising:
simplifying a computational mesh by:
generating a distributed data representation of the computational mesh in a storage system, wherein the data representation comprises an interconnection weight that represents the magnitude of an interconnection between each of a plurality of computational cells in the computational mesh;
on a first processor, determining a first threshold value, wherein determining the first threshold value comprises:
calculating a maximum interconnection weight for interconnections of each of a first portion of the plurality of computational cells to all adjoining computational cells;
identifying the largest value of the maximum interconnection weight for all of the first portion of the plurality of computational cells;
identifying the smallest value of the maximum interconnection weights for all of the first portion of the plurality of computational cells; and
selecting the first threshold value to lie between the largest value and the smallest value, on a second processor, determining a second threshold value, wherein determining the second threshold value comprises:
calculating a maximum interconnection weight for interconnections of each of a second portion of the plurality of computational cells to all adjoining computational cells;
identifying the largest value of the maximum interconnection weight for all of the second portion of the plurality of computational cells;
identifying the smallest value of the maximum interconnection weights for all of the second portion of the plurality of computational cells; and
selecting the second threshold value to lie between the largest value and the smallest value;

selecting a final threshold value based at least in part on the first threshold value and the second threshold value;
comparing the final threshold value to each interconnection weight and setting any interconnection weight that is equal to or less than the final threshold value to zero, wherein comparing the final threshold value to each interconnection weight comprises using the formula $$\left(1 + \frac{d_{ij} + d_{ji}}{d_{ij}d_{ji}} a_{ij}\right) \le \sigma,$$

wherein $d_{ij}$ and $d_{ji}$ represent the diagonal elements of the computational cells i and j in a Jacobian matrix, wherein σ represents the final threshold value, and wherein $a_{ij}$ represents transmissibility, and wherein comparing the final threshold value to each interconnection weight does not involve global communications for this iteration or any subsequent iteration;
  eliminating any of the plurality of computational cells from the computational mesh that has no interconnections to other computational cells to create a lower level computational mesh; and
  generating a preconditioner by restricting a solution to the lower level computational mesh; and
simulating a hydrocarbon reservoir using the preconditioner.

13. The method of claim 12, further comprising:
generating a sequence of lower level computational meshes in the storage system by iteratively:
  generating a third threshold value for an iteratively lower level computational mesh to lie between a largest interconnection weight value and a smallest interconnection weight value for the computational cells in the first lower level computational mesh;
  comparing the third threshold value to each interconnection weight and setting any interconnection weight that is equal to or less than the third threshold value to zero; and
  eliminating any computational cell from the iteratively lower level computational mesh that has no interconnections to other computational cells to create a next lower level computational mesh; and
generating a preconditioner that restricts a solution to a lowest level computational mesh; and
iteratively generating a preconditioner that restricts a solution to a next higher computational mesh in the sequence until a highest level computational mesh in the sequence is reached.

14. The method of claim 12, further comprising identifying new locations for production wells or injection wells based, at least in part, upon a result from the simulation of the hydrocarbon reservoir.

15. The method of claim 12, further comprising determining whether to convert a production well into an injection well, convert an injection well into a production well, or any combinations thereof, based, at least in part, on a result from the simulation of the hydrocarbon reservoir.

16. A non-transitory, computer readable medium, comprising code configured to direct a processor to:
  generate a distributed data representation in a computer storage system, wherein the data representation comprises an interconnection weight that represents the magnitude of an interconnection between each of a plurality of computational cells in a computational mesh;
  on a first processor, determine a first threshold value, wherein determining the first threshold value comprises:
    calculating a maximum interconnection weight for interconnection of each of a first portion of the plurality of computational cells to all adjoining computational cells;
    identifying the largest value of the maximum interconnection weight for all of the first portion of the plurality of computational cells;
    identifying the smallest value of the maximum interconnection weight for all of the first portion of the plurality of computational cells; and
    selecting the first threshold value to lie between the largest value and the smallest value,
  on a second processor, determine a second threshold value, wherein determining the second threshold value comprises:
    calculating a maximum interconnection weight for interconnections of each of a second portion of the plurality of computational cells to all adjoining computational cells;
    identifying the largest value of the maximum interconnection weight for all of the second portion of the plurality of computational cells;
    identifying the smallest value of the maximum interconnection weights for all of the second portion of the plurality of computational cells; and
    selecting the second threshold value to lie between the largest value and the smallest value,
  select a final threshold value based at least in part on the first threshold value and the second threshold value;
  compare the final threshold value to each interconnection weight, wherein the data representation comprises a matrix, wherein comparing the final threshold value to each interconnection weight comprises using the formula $$\left(1 + \frac{d_{ij} + d_{ji}}{d_{ij}d_{ji}} a_{ij}\right) \le \sigma,$$

wherein $d_{ij}$ and $d_{ji}$ represent the diagonal elements of the computational cells i and j in the matrix, wherein σ represents the final threshold value, and wherein $a_{ij}$ represents transmissibility, and wherein comparing the final threshold value to each interconnection weight does not involve global communications for this iteration or any subsequent iteration; and
  set any interconnection weight that is equal to or less than the final threshold value to zero.

17. The non-transitory, computer readable medium of claim 16, further comprising:
  a matrix in which each diagonal element represents one of the plurality of computational cells in the computational mesh; and
  code configured to direct the processor to:
    generate the interconnection weights between each of the plurality of computational cells from off-diagonal elements in the matrix;
    compare the final threshold value to each interconnection weight, and for each of the plurality of computational cells that have an interconnection weight equal to or less than the final threshold value, setting the off-diagonal elements to zero; and
    eliminate any rows in the matrix that have no remaining off-diagonal elements to generate a lower level matrix.

18. The non-transitory, computer readable medium of claim 16, further comprising code configured to direct the processor to construct a preconditioner by restricting the solution to a lower level matrix.

* * * * *